(12) United States Patent
Lee et al.

(10) Patent No.: US 8,566,407 B2
(45) Date of Patent: *Oct. 22, 2013

(54) TEXT-BASED COMMUNICATION CONTROL FOR PERSONAL COMMUNICATION DEVICES

(75) Inventors: Michael M. Lee, San Jose, CA (US); Matthew M. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 230 days.

This patent is subject to a terminal disclaimer.

(21) Appl. No.: 12/883,791

(22) Filed: Sep. 16, 2010

(65) Prior Publication Data

US 2011/0004946 A1 Jan. 6, 2011

Related U.S. Application Data

(63) Continuation of application No. 12/006,696, filed on Jan. 3, 2008, now Pat. No. 7,814,163.

(51) Int. Cl.
*G06F 15/16* (2006.01)
(52) U.S. Cl.
USPC .......................................... 709/206; 709/207
(58) Field of Classification Search
USPC .................................................. 709/204–207
See application file for complete search history.

(56) References Cited

U.S. PATENT DOCUMENTS

| 7,519,668 B2* | 4/2009 | Goodman et al. ............. 709/206 |
| 7,610,341 B2 | 10/2009 | Daniell |
| 2008/0134282 A1 | 6/2008 | Fridman et al. |

OTHER PUBLICATIONS

Non-Final Office Action (dated Nov. 24, 2009), U.S. Appl. No. 12/006,696, filed Jan. 3, 2008, First Named Inventor: Michael M. Lee, (9 pages).

* cited by examiner

*Primary Examiner* — Peling Shaw
(74) *Attorney, Agent, or Firm* — Park, Vaughan, Fleming & Dowler LLP

(57) ABSTRACT

Systems, devices, and methods are provided for enabling a user to control the content of text-based messages sent to or received from an administered device. In some embodiments, a message will be blocked (incoming or outgoing) if the message includes forbidden content. In other embodiments, the objectionable content is removed from the message prior to transmission or as part of the receiving process. The content of such a message is controlled by filtering the message based on defined criteria. The criteria may be defined according to a parental control application. These techniques also may be used, in accordance with instructional embodiments, to require the administered devices to include certain text in messages. These embodiments might, for example, require that a certain number of Spanish words per day be included in e-mails for a child learning Spanish.

16 Claims, 19 Drawing Sheets

TEXT-BASED COMMUNICATION CONTROL FOR PERSONAL COMMUNICATION DEVICES

RELATED MATTERS

This application is a continuation of U.S. patent application Ser. No. 12/006,696, filed Jan. 3, 2008, entitled "Text-Based Communication Control for Personal Communication Devices, currently pending.

BACKGROUND

This relates to text-based communication devices. The proliferation of computers and compact portable devices has led to vast amounts of text-based communication. One problem with text-based communications is that there is no way to monitor and control text communications to make them user appropriate. For example, users such as children may send or receive messages (intentionally or not) with parentally objectionable language. Also, because electronic text-based messaging often can be informal, some users may draft messages that are grammatically incorrect.

One way in which parental control can be accomplished is to limit the access points that a user can have. For example, a parent could prevent a child user from accessing specific websites, or limit the user to communicating electronically with a limited set of individuals or e-mail addresses. Such solutions, however, still do not address the content of the communications that the child user has with the permitted communicators.

One way that systems can be used to attempt to control the content that a user can view is to pass all of the communications through a dictionary which prevents a given set of words from being communicated. For example, many such dictionaries, if selected, typically prevent the user from sending or receiving curse words. One problem with this potential solution is that the dictionaries are often fixed. Another potential problem with such dictionaries is that they do not have the ability to prevent the use of non-standard forms of words from being communicated, such as those types of words that are often communicated via text messaging (such as, for example, text messaging "LOL" instead of typing out the full text of "lots of luck").

SUMMARY OF THE INVENTION

The invention, in various embodiments, addresses deficiencies in existing attempts at solutions by providing systems, methods and devices that enable an administrator to control the text-based communications of a user of a text-based communications device through an administrative mode of an intelligent text-based communication control unit or application. The text-based communication control application filters incoming and/or outgoing text-based communications based on administrator-defined criteria.

In one embodiment, the control application includes a parental control application. The parental control application evaluates whether or not the communication contains approved text based on, for example, objective ratings criteria or a user's age or grade level, and, if unauthorized, prevents such text from being included in the text-based communication. If the control contains unauthorized text, the control application may alert the user, the administrator or other designated individuals of the presence of such text. The control application may require the user to replace the unauthorized text or may automatically delete the text or the entire communication.

In another embodiment, the control application includes an instructional tool or study aid where the administrator sets one or more modes, such as language, vocabulary, grammar, spelling, punctuation and/or other content of a text-based communication based on, for example, a user's age or grade level. This can be especially useful, for example, such as when a child's grades go down. A parent can then institute a condition to improve a child's grades. For example, the control application may require a user during specified time periods to send messages in a designated foreign language, to include certain designated vocabulary words, or to use proper designated spelling, designated grammar and designated punctuation and like designated language forms based on the user's defined skill level and/or designated language skill rating. If the text-based communication fails to include the required language or format, the control application may alert the user and/or the administrator/parent of the absence of such text.

The control application may require the user to rewrite the text-based communication in the required language, to include the required vocabulary words and/or to correct spelling and punctuation errors. The control application may require the user to locate the error. If the user cannot correct the error, the control application may provide hints as to the location of the error by first indicating the paragraph, then, the line and, finally, the exact location.

In some embodiments, a text-based communication device includes a user interface that enables a user to perform at least one of inputting and editing a message. The device also includes a transmitter for sending the message. The device further includes a processor that controls the sending of the message based on a portion of the message and one or more message control conditions.

In some embodiments, the message control conditions include at least one of required text, banned text, authorized text and designated language. In other embodiments, the device includes a data storage that include at least one of a number of required text words, a number of banned text words, a number of authorized text words, and a number of designated language forms.

In still other embodiments, controlling includes comparing a portion of the message with the stored data to determine whether the communication satisfies one or more message control conditions. In these instances, controlling may also include: (i) preventing the sending of the message if the message does not satisfy one or more message control conditions; or (ii) allowing the message to be sent if the message satisfies all of the message control conditions. Controlling may further include prompting the user to modify the message if the message does not satisfy one of the message control conditions.

In some embodiments, at least one of the message control conditions includes applying ratings to the message control conditions, at least one of which can correspond to the user's designated language skill rating. The rated message control conditions can be applied to the entire message or a portion of the message according to the user's designated language skill rating. In further embodiments, the designated language may include a required foreign language, vocabulary, spelling, grammar and/or punctuation based on the user's designated skill level.

In other embodiments, a text-based communication device includes a user interface that enables a user to view a message, a receiver that receives the message from a sender, and a processor that controls the receiving of the message based on a portion of the message and one or more message control conditions.

In yet other embodiments, a communications system includes a first communication device that performs at least one of sending and receiving a message. The communications system also includes an administrator unit that performs at least one of controlling the sending of the message and the receiving of the message based on message control conditions. The message control conditions may include rated message control conditions where at least one of the rated message control conditions corresponds to a designated language skill level of a user of the first communication devices. In certain embodiments, the controlling function includes at least one of: (i) preventing the sending or receiving of the message if the message does not satisfy the rated message control conditions corresponding to the user's designated language skill rating; and (ii) allowing the sending or receiving of the message if the message satisfies all of the rated message control conditions corresponding to the user's designated language skill rating.

While the above was described with respect to one or more various embodiments, persons skilled in the art will appreciate that the features described herein with respect to one or more embodiments can be combined together without departing from the spirit of the present invention.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE DISCLOSURE

Figure 1A:
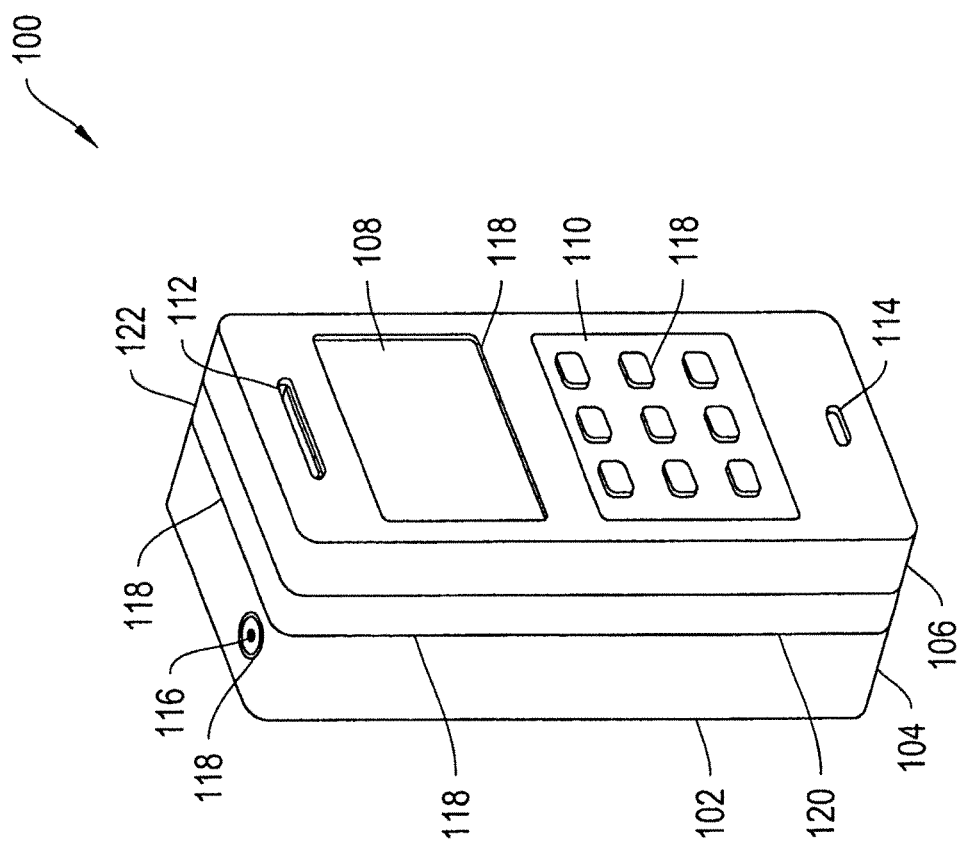
FIG. 1A is a perspective view of a device capable of text-based communication with an exposed frame assembly according to an illustrative embodiment of the invention.

FIG. 1A is a perspective view of a text-based communication device 100 according to an illustrative embodiment of the invention. The text-based communication device 100 includes a housing 102, a first housing portion 104, a second housing portion 106, a display 108, a keypad 110, a speaker housing aperture 112, a microphone housing aperture 114, a headphone jack 116, and frame sidewall 122. Although not shown, in certain embodiments, the frame sidewall 122 is the exposed portion of a frame residing within or adjacent to the housing 102 that provides structural support for the text-based communication device 100 and various internal components. The housing 102 can also include various gaps 118, such as openings, separations, vents, or other pathways between elements of the housing 102 that enable the passage of air or sound through the housing 102.

In one embodiment, the housing 102 includes a first housing portion 104 and a second housing portion 106 that are fastened together to encase various components of the text-based communication device 100. In certain embodiments, the housing 102 can also include an exposed frame 120 that provides structural support for the text-based communication device 100. The housing 102 and its housing portions 104 and 106 may include polymer-based materials that are formed by, for example, injection molding to define the form factor of the text-based communication device 100. In one embodiment, the housing 102 surrounds and/or supports internal components such as, for example, one or more circuit boards having integrated circuit components, internal radio frequency (RF) circuitry, an internal antenna, a speaker, a microphone, a hard drive, a processor, and/or other components. Further details regarding certain internal components are discussed below with respect to FIG. 3. The housing 102 can provide for mounting of a display 108, keypad 110, external jack 116, data connectors, or other external interface elements. The housing 102 can include one or more housing apertures 112 to facilitate delivery of sound, including voice and music, to a user from a speaker within the housing 102. The housing 102 can include one or more housing apertures 114 to facilitate the reception of sounds, such as voice, for an internal microphone from a user.

In certain embodiments, the housing 102 includes one or more gaps 118 associated with the housing 102. These gaps 118 can result from the design, manufacturing and/or assembly process for the text-based communication device 100. For example, in certain circumstances, the mechanical attachment of the first housing portion 104 with the second housing portion 106 or the sidewall 122 can result in a crease 120 or joint between the portions 104 and 106. In certain text-based communication devices 100, the crease 120 may not be air tight, resulting in gaps 118 along the crease. Other gaps may be formed during assembly between, for example, one or more keys of the keypad 110 and the housing 102 or the display 108 and the housing 102, resulting in additional gaps 118. In other embodiments, the housing 102 may include addition portions that are integrated to form the housing 102 for the text-based communication device 100.

The text-based communication device 100 may include a wireless communications device such as a cellular telephone, satellite telephone, cordless telephone, personal digital assistant (PDA), pager, portable computer, or any other device capable of wireless communications. In fact, FIG. 1A shows an exemplary cellular telephone version of a broad category of text-based communication device 100.

The text-based communication device 100 may also be integrated within the packaging of other devices or structures such a vehicle, video game system, appliance, clothing, helmet, glasses, wearable apparel, stereo system, entertainment system, or other portable devices. In certain embodiments, device 100 may be docked or connected to a wireless enabling accessory system (e.g., a Wi-Fi docking system) that provides the text-based communication device 100 with short-range communicating functionality. Alternative types of text-based communication devices 100 may include, for example, an Apple® iPhone that is made available by Apple Inc., of Cupertino, Calif., pocket-sized personal computers such as an iPAQ® Pocket PC available by Hewlett Packard Inc., of Palo Alto, Calif. and any other device capable of communicating wirelessly (with or without the aid of a wireless enabling accessory system).

In certain embodiments, the text-based communication device 100 may synchronize with, for example, a remote computing system or server to receive text-based communication (using either wireless or wireline communications paths). Wireless syncing enables the text-based communication device 100 to transmit and receive media and data without requiring a wired connection. Media may include, without limitation, text, sound or audio files, music, video, multimedia, and digital data, in streaming and/or discrete (e.g., files and packets) formats.

During synchronization, a host system may provide text to a client system or software application embedded within the text-based communication device 100. In certain embodiments, text data is "downloaded" to the text-based communication device 100. In other embodiments, the text-based communication device 100 is capable of uploading text to a remote host or other client system (and in other embodiments, the system is capable of downloading and uploading text).

Figure 1B:
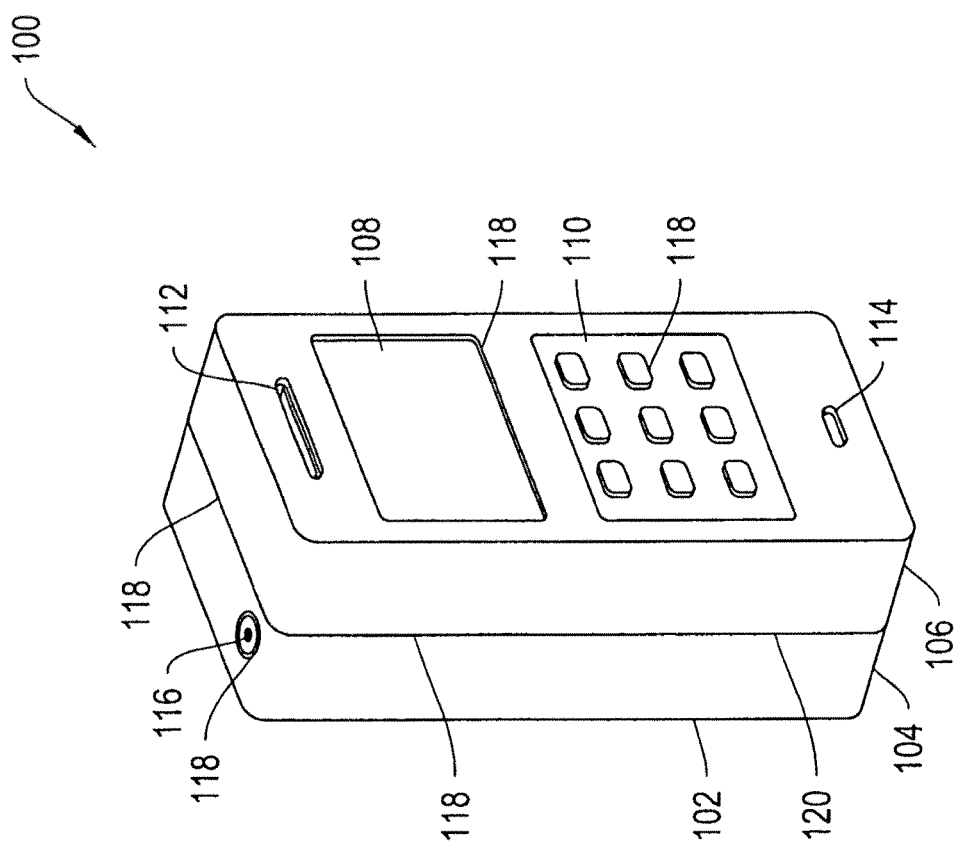
FIG. 1B is another perspective view of a device capable of text-based communication according to an illustrative embodiment of the invention.

FIG. 1B is another perspective view of a text-based communication device 100 according to an illustrative embodiment of the invention. In this embodiment, as opposed to the embodiment of FIG. 1A, the text-based communication device's frame and/or the frame's sidewalls are not exposed to an external surface of the device. However, in certain embodiments, the frame is connected internally with at least a portion of one of the first housing portion 104 or the second housing portion 106.

Figure 1C:
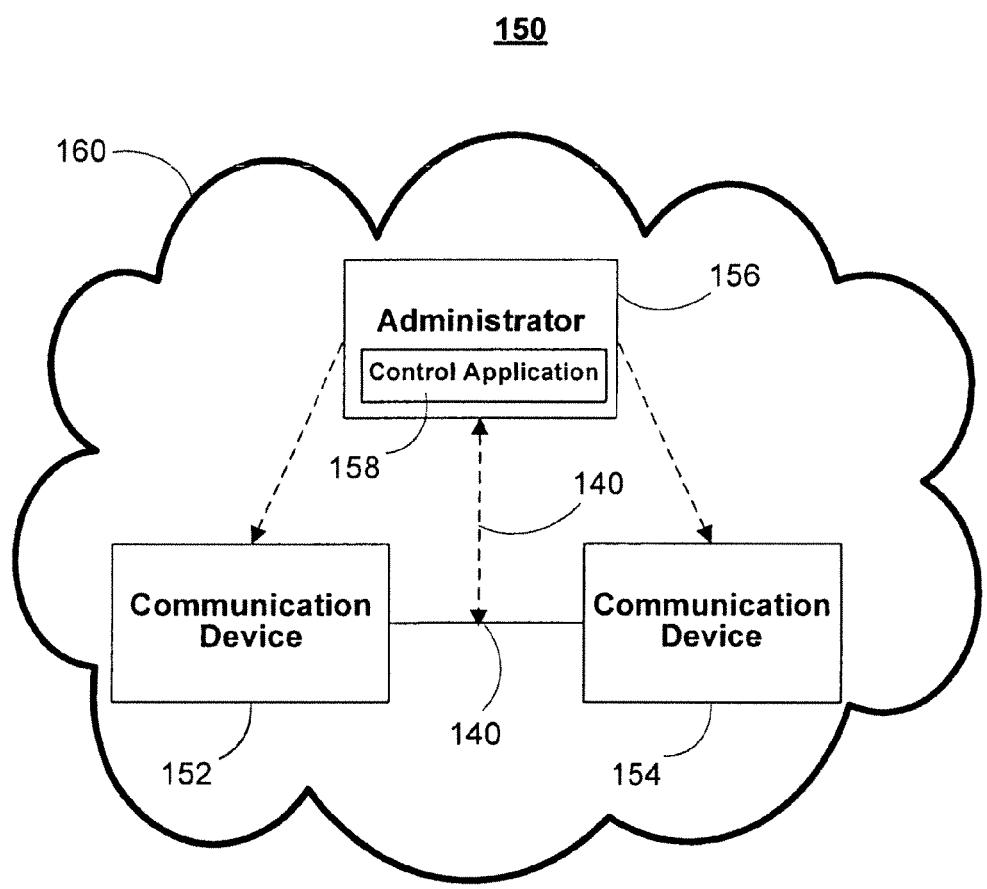
FIG. 1C shows a diagram of a communications system according to an illustrative embodiment of the invention.

FIG. 1C is a diagram of a communications system according to an illustrative embodiment of the invention. The system 150 includes communication network 160, communication device 152, communication device 154, administrator 156 and data links 140. A text-based communications device 100 is capable of functioning as communication device 152 or 154. In certain embodiments, the administrator 156 is included in one of communication devices 152 or 154. The administrator may include and/or interface with a text-based message control application 158.

Figure 2:
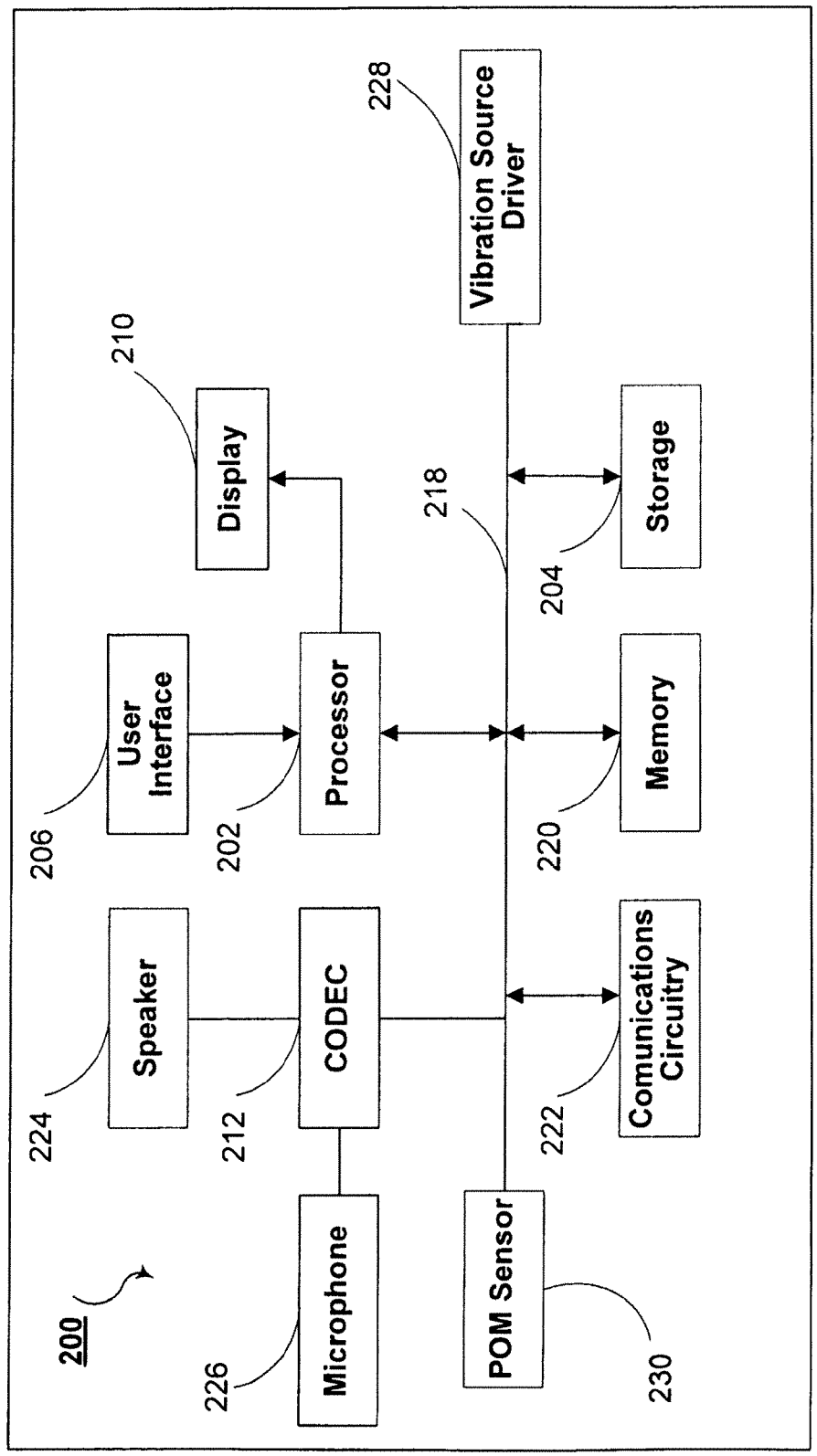
FIG. 2 shows a simplified block diagram of a device capable of text-based communication according to an illustrative embodiment of the invention.

FIG. 2 shows a simplified functional block diagram of the text-based communications device 200 according to an illustrative embodiment of the invention. The text-based communications device 200 may be any device suitable for transmitting a text-based communication (e.g., e-mail, text messaging, instant messaging), such as, for example, device 100 of FIG. 1A.

The text-based communications device 200 can include processor 202, storage device 204, user interface 206, display 210, CODEC 212, bus 218, memory 220, communications circuitry 222, speaker 224, microphone 226, vibration source driver 228 and POM sensor 230. Processor 202 can control the operation of many functions and other circuitry included in text-based communication device 200. Processor 202 can drive display 210 and can receive user inputs from the user interface 206.

Storage device 204 can store the conditions created by an administrator, text data associated with the administrator conditions, software (e.g., for implementing the administrator conditions), wireless connection information (e.g., information that may enable text-based communication device to establish wireless communication with another device), subscription information (e.g., information that enables automatic updating of text data), and any other suitable data. Storage device 204 may include one more storage mediums, including for example, a hard-drive, permanent memory such as ROM, semi-permanent memory such as RAM, or cache.

Memory 220 may include one or more different types of memory that can be used for performing various device functions. For example, memory 220 may include cache, ROM, and/or RAM. Bus 218 may provide a data transfer path for transferring data to, from, or between at least storage device 204, memory 220, and processor 202. The CODEC 212 may also convert audio inputs from the microphone 226 into digital audio signals. The CODEC 212 may include a video CODEC for processing digital and/or analog video signals.

User interface 206 may allow a user to interact with the text-based communication device 200. For example, the user input element or interface 206 can take a variety of forms, such as a button, keypad, dial, click wheel, or touch screen. Communications circuitry 222 may include circuitry for wireless communication (e.g., short-range and/or long range communication). For example, the wireless communication circuitry may be Wi-Fi enabling circuitry that permits wireless communication according to one of the 802.11 standards. Other wireless network protocol standards could also be used, either, instead of the identified protocols, or in addition to the identified protocol. Other network standards may include Bluetooth, the Global System for Mobile Communications (GSM), and code division multiple access (CDMA) based wireless protocols. Communications circuitry 222 may also include circuitry that enables device 200 to be electrically coupled to another device (e.g., a computer or an accessory device) and communicate with that other device.

In one embodiment, the text-based communication device 200 may be a stationary computing device. For example, a personal computer that enables a user to communicate via e-mail, text messaging, instant messaging and other similar text applications.

In one embodiment, the text-based communication device 200 may be a portable device such as a cellular phone (e.g., Apple® iPhone) or other suitable personal device that enables a user to communicate via e-mail, text messaging, instant messaging and other similar text applications.

Device 200 may include a control application 158 (such as that shown in FIG. 1C) that controls certain aspects of transmitted or received text-based messages. The control application 158 filters incoming and/or outgoing text-based communications and attachments based on administrator-defined criteria. In one embodiment, the control application 158 is a parental control application. The control application 158 evaluates whether or not the communication contains approved text (or objectionable text) based on, for example, objective ratings criteria or a user's age or grade level, and, if unauthorized, prevents such text from being included in the text-based communication.

In another embodiment, the control application 158 is an instructional tool or study aid where the administrator sets required language, vocabulary, grammar, spelling, punctuation and/or other content of a text-based communication based on, for example, a user's age or grade level. According to administrator defined conditions, the control application 158 can require a user, during certain time periods, to send messages in a foreign language, to include certain vocabulary words, or to use proper spelling, grammar and/or punctuation based on the user's defined skill level. This could aide the user in more quickly improving his or her fluency of a language.

The control application 158 can be implemented on the user device. If the control application 158 is implemented on the user device, the control application 158 may be stored in storage device 204 and loaded into the memory 220 for use by processor 202. In another embodiment, the control application 158 may be implemented on a first device 200, (e.g., device 152) while a user text-based communication application, subject to control by the control application 158, may be implemented on a second device 200 (e.g., device 154). Certain administrative conditions may be set by an administrator within the first device 200 (e.g., device 152) and transmitted (e.g., via Wi-Fi, infrared, USB, or other suitable transmission method) to the second device 200 (e.g., device 154) where they are stored in storage device 204 and loaded into memory 220 for use by the processor 202 (the conditions also may be saved on the administrator's device).

In another embodiment, the control application 158 can be implemented on a device 156 (the "administrator device"), which can act as an intermediary between one or more user devices 200 (e.g., 152 and 154). The administrator device 156 can check each transmitted message for compliance with the administrative conditions. In some of those embodiments, the administrator device 156 can automatically modify the messages to ensure compliance. In other embodiments, the administrator device 156 may instead alert the receiving or sending user device 200 to take appropriate remedial action before transmission will be permitted.

The control application 158 may apply to any incoming and/or outgoing text-based communication, including, for example, e-mails, e-mail attachments, text messages and instant messages. In some embodiments the control application 158 may allow the administrator to define the user to which the condition is applied. For example, the control application 158 may provide a list of e-mail addresses, text messaging addresses or other unique device identifiers. In response to an administrator selecting one or more addresses or a select an "ALL" option, the control application 158 can apply the conditions to the selected user addresses and/or devices.

FIGS. 3-10 show various illustrative display screens of a text-based communication control application 158 in administrative mode, in accordance with an embodiment of the present invention. The control application 158 enters the administrative mode in response to the administrator inputting a password or other appropriate access code on the onscreen keyboard (see, for example, reference 412 on FIG. 4) or other user input device.

Figure 3:
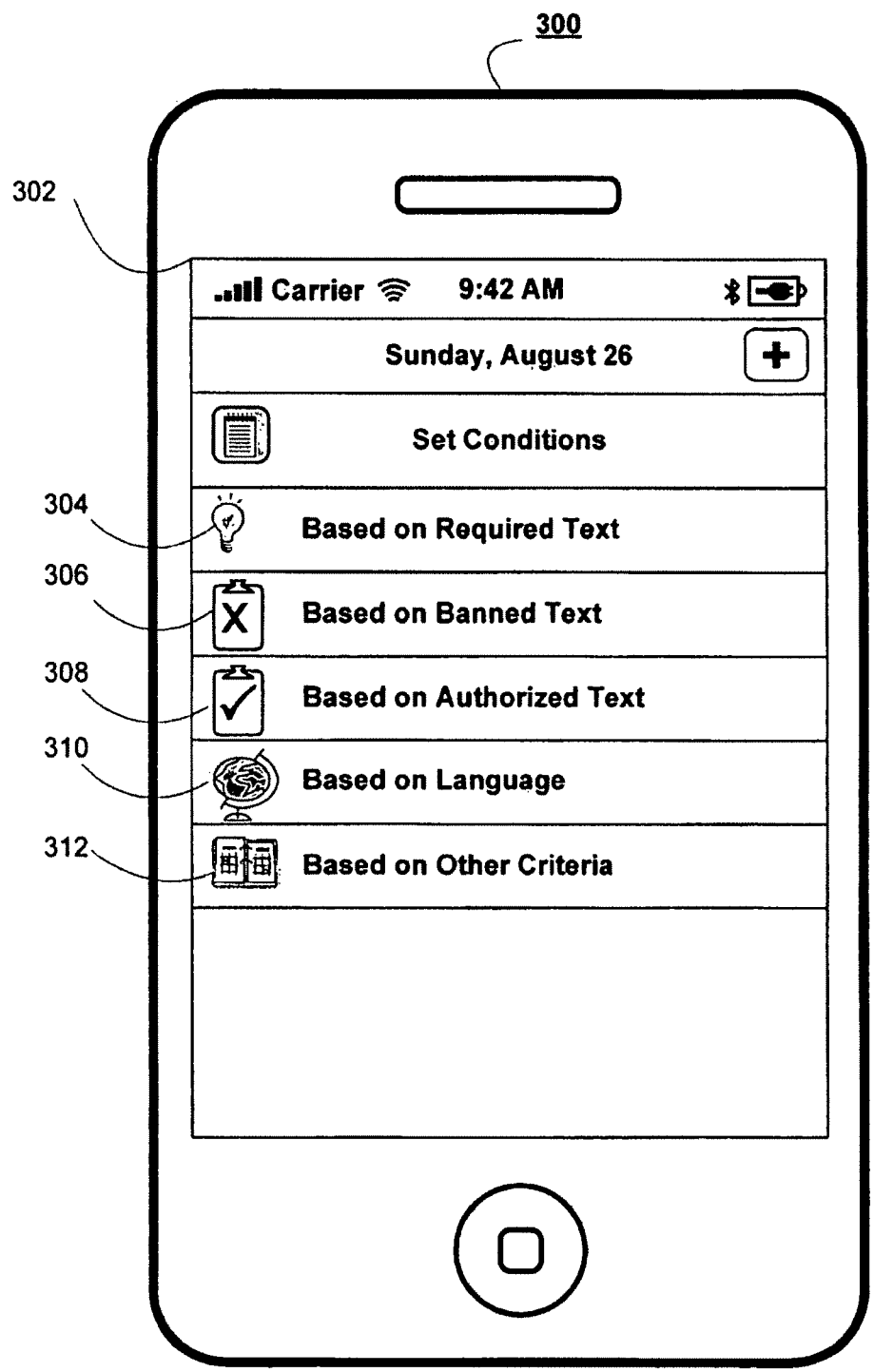
FIGS. 3-8 are illustrative displays of an administrative mode of a text-based communication control application according to various embodiments of the invention.

FIG. 3 shows an illustrative condition menu display 302 having selectable condition options. In this example, the options include required text 304, banned text 306, authorized text 308, language 310, and other criteria 312. This list is only illustrative, as other approaches may include a subset of these options, other options, or a combination thereof.

In response to the administrator identifying one of the condition options, the control application 158 provides a display or 'set of displays suitable for allowing the administrator to define the condition of the option. Required text option 304, for example, allows the administrator to set up a list of required words that must be included in a message. In response to the administrator selecting this option, the control application 158 provides a required text display that allows the administrator to define or select required words and may include words in another language.

Figure 4:
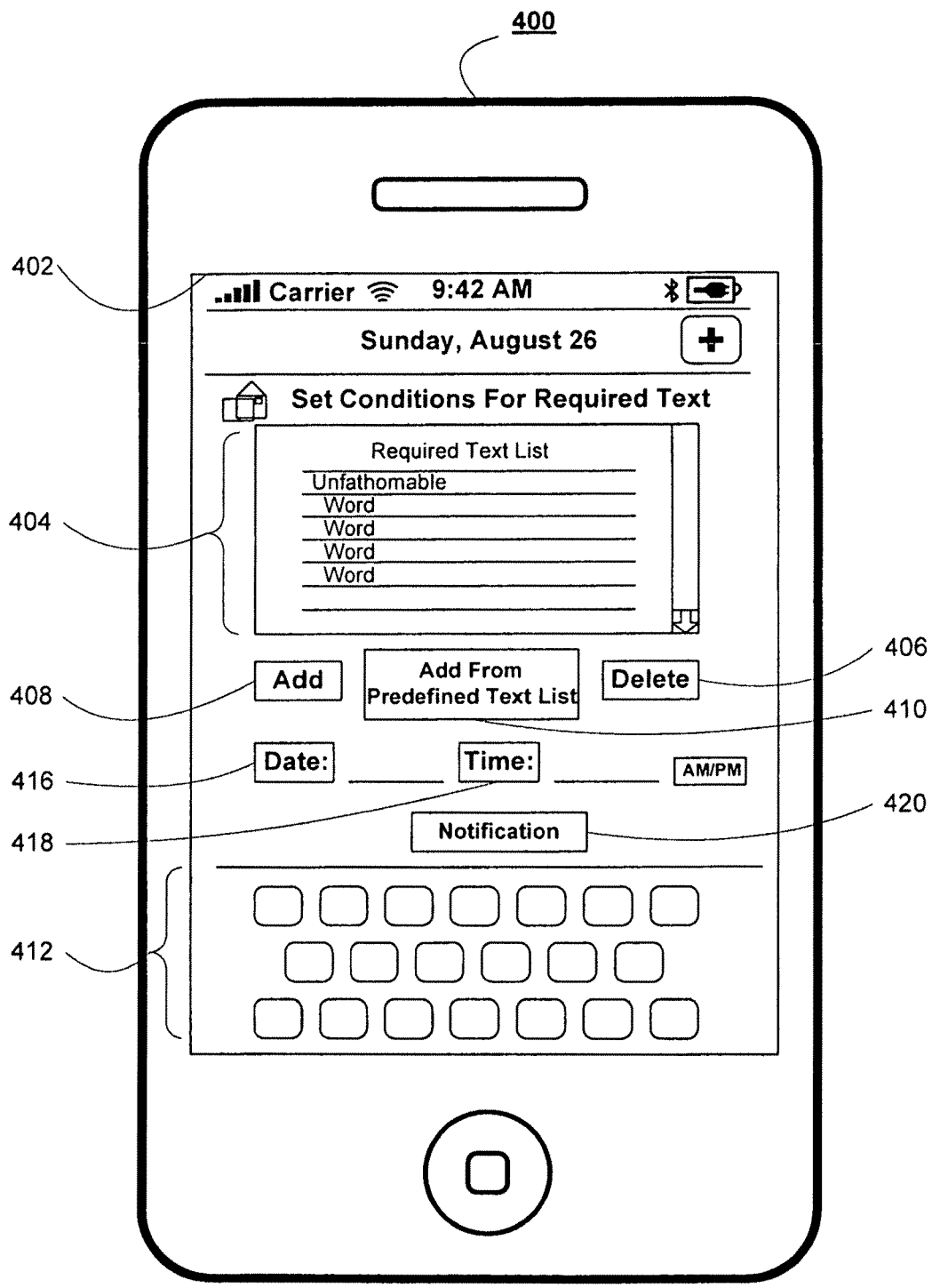

FIG. 4 shows an illustrative required words display 402, according to an embodiment of the invention. In this example, display 402 includes list 404 of currently required words, "Delete" option 406, "Add" option 408, "Add From Predefined Text List" option 410, "Date" option 416, "Time" option 418 and "Notification" option 420. In response to the administrator selecting a word and selecting "Delete" option 406, the control application 158 can delete the selected word from required list 404. In response to the administrator selecting "Add" option 408, the control application 158 can provide an onscreen keyboard 412 that a user can use to input required words letter by letter. The control application 158 may also provide a voice recognition program that enables the administrator to verbally add text.

Figure 5:
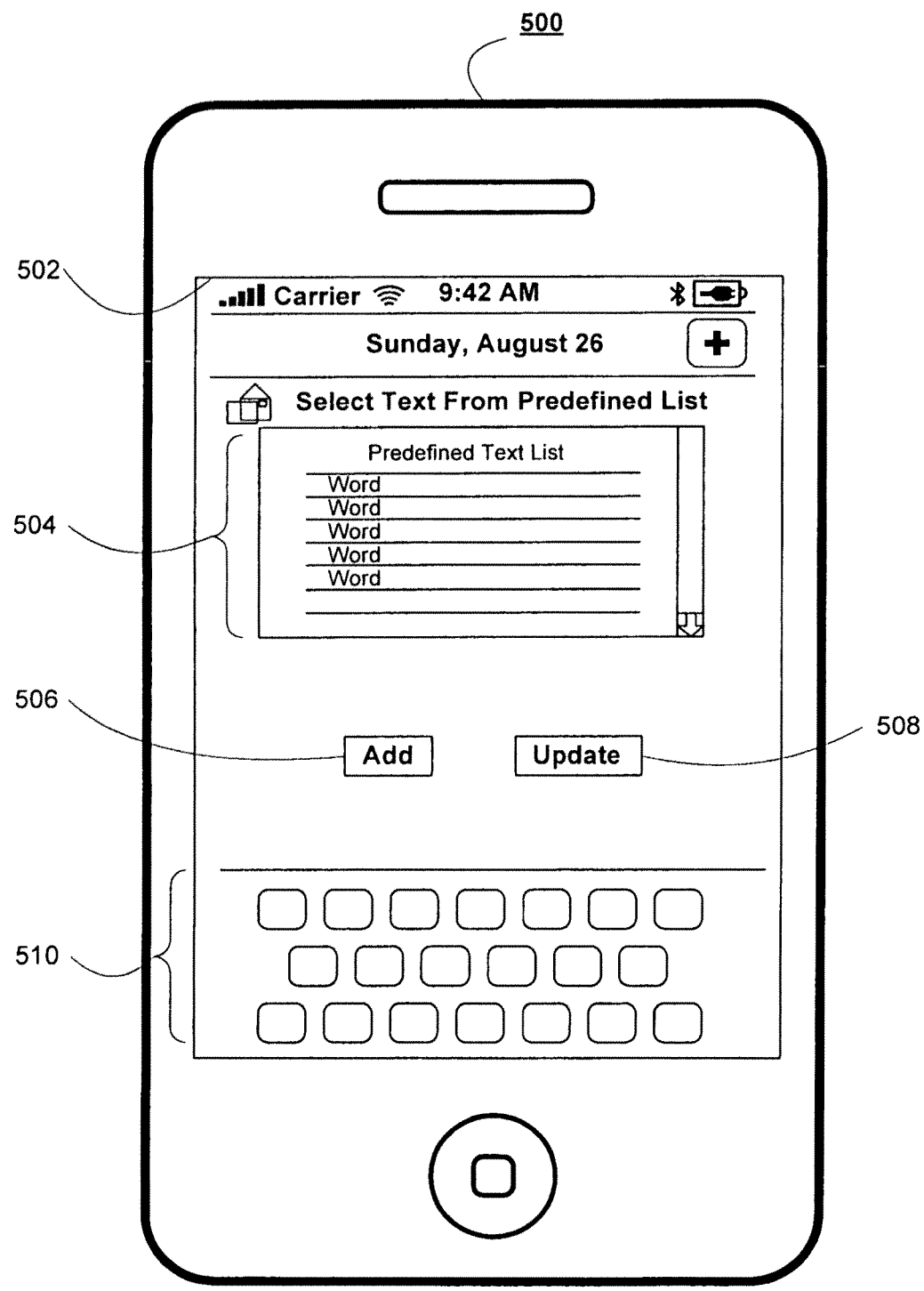

In response to the administrator selecting "Add From Predefined Text List" option 410 (FIG. 4), the control application 158 can provide a display or set of displays suitable for allowing the administrator to include selected text from predefined text list 504 in required list 404 (such as is shown in FIG. 5).

In response to the administrator selecting "Date" option 416, the control application 158 can present a calendar and/or days of the week for the administrator to define the dates or days when the required text condition would be in effect. In response to the administrator selecting "Time" option 418, the control application 158 can present a clock for the administrator to define the time of day when the required text condition would be in effect. The control application 158 may provide for the date option 416 and time option 418 to be set to reoccur automatically. For example, the administrator can program the required text condition to be in effect for a certain number of calendar dates such as one week, for every Wednesday or for every day between 1PM and 2PM. For example, a child's weekly vocabulary list may be included in required text 404 so that every message sent by a user during that time period must contain at least one word from the weekly vocabulary list.

In response to the administrator activating notify option 420, the control application 158 may alert the administrator by e-mail message or other appropriate means of any user's failure to meet the required text condition. In some embodiments, the control application 158 may alert the administrator generally of any user's failure to meet the required text condition. In some embodiments, the control application 158 may also alert the administrator when a user complies with the required text condition. For example, the control application 158 may notify the administrator of the required text used by the user or may send the administrator a copy of the message where the required text was included.

FIG. 5 shows an illustrative predefined text menu display 502 having selectable options, according to an embodiment of the invention. In this example, the options include "Add" option 506 and "Update" option 508. This list is only illustrative, as other approaches may include a subset of these options, or other options. In response to the administrator selecting "Update" option 508, the control application 158 may update the predefined text list by transmitting and receiving data from a host or other client system such as, for example, Apple® iTunes. In some embodiments, the control application 158 may display the predefined text list 504 in alphabetical order or randomly. If displayed in alphabetical order, the control application 158 may provide an onscreen keyboard 510 for easy searching where the list automatically scrolls to words beginning with the typed letter combination.

In some embodiments, where the predefined text list is displayed randomly, the control application 158 may provide for the administrator to sort the entries or may locate words in response to administrator searches. In response to the administrator selecting an entry or entries from predefined text list 504 and, then, activating "Add" option 506, the control application 158 can add that entry or entries to current required text 404 (FIG. 4).

Returning to FIG. 3, condition menu display 302 also includes banned text option 306. In response to the administrator's selection of this option, the control application 158 can provide a display or set of displays suitable for allowing the administrator to define a list of banned words. This option functions similar to, but opposite of, the required text option 304. Namely, banned text option 306, for example, allows the administrator to set up a list of banned words that may be excluded from a message. In some embodiments, the control application 158 will replace the banned text with approved text with the same meaning. In some embodiments, the control application 158 will delete the banned text, delete the sentence containing the banned text or delete the entire message (or any combination thereof). In some embodiments, the control application 158 can indicate the deleted and/or substituted text in the message.

Figure 6:
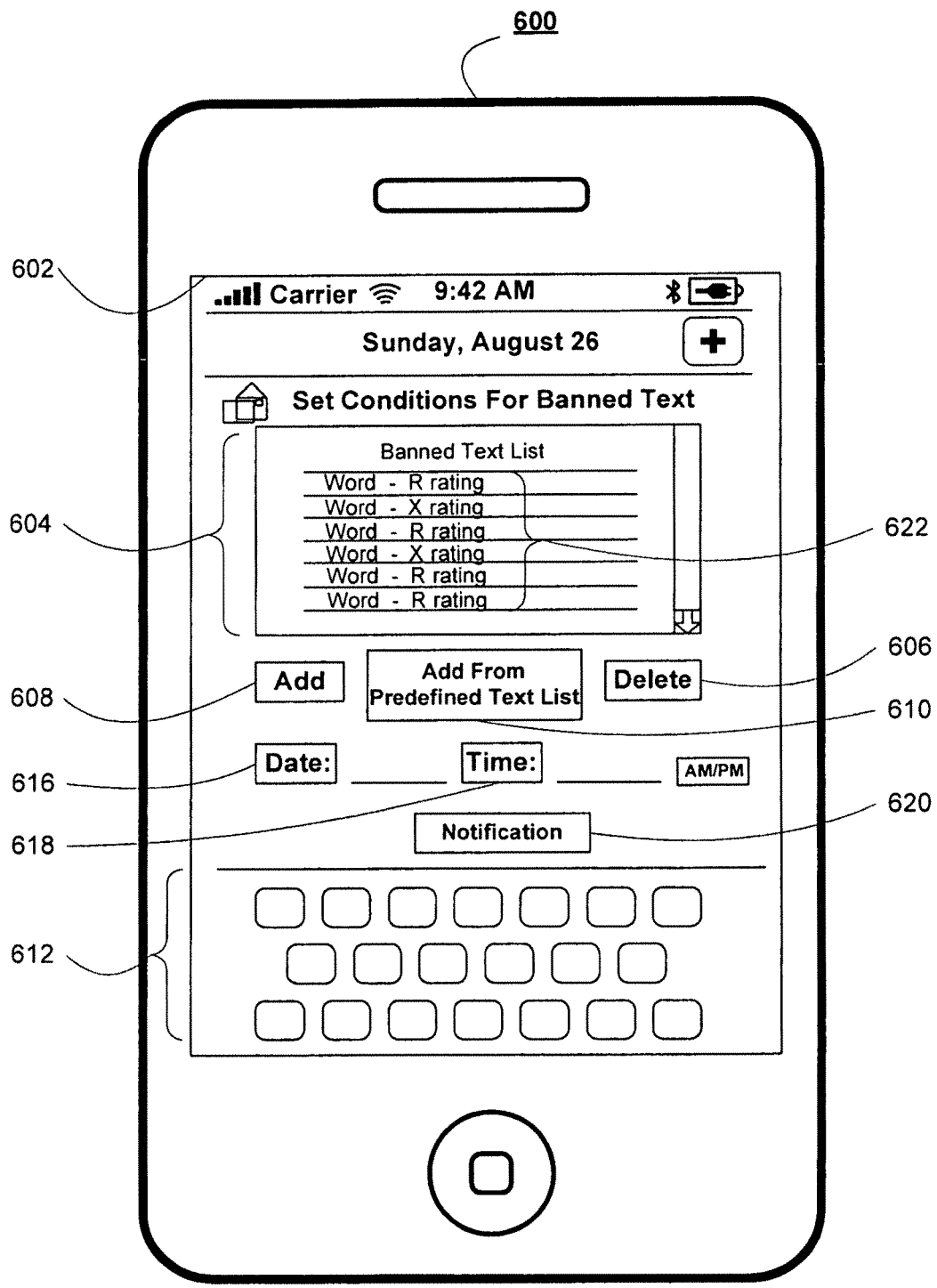

FIG. 6 shows an illustrative banned words display 602, according to an embodiment of the invention. In this example, display 602 includes list of banned text 604, "Delete" option 606, "Add" option 608, "Add From Predetermined Text List" option 610, "Date" option 616, "Time" option 618, "Notification" option 620 and rating option 622. In response to the administrator selecting a word and selecting "Delete" option 606, the control application 158 can delete the selected word from banned list 604. In response to the administrator selecting "Add" option 608, the control application 158 can provide an onscreen keyboard 612 for the user to type in banned words. The control application 158 may also provide a voice recognition program that enables the administrator to add banned text to the system by simply speaking the banned words.

In response to the administrator selecting "Date" option 616, the control application 158 can present a calendar and/or days of the week for the administrator to define the dates or days when the banned text condition would be in effect. In response to the administrator selecting "Time" option 618, the control application 158 can present a clock for the administrator to define the time of day when the required text condition would be in effect. The control application 158 may provide for the date option 616 and time option 618 to be set to reoccur automatically. For example, the administrator can program the required text condition to be in effect for a certain number of calendar dates, such as two years. In response to the administrator activating "Notification" option 620, the control application 158 can alert the administrator by e-mail message or other appropriate means of any user's failure to meet the banned text condition 604. In some embodiments, the control application 158 may send the administrator a copy of the inappropriate message for the administrator to release the message, if it is found to be acceptable. In some embodiments, the administrator may be notified of the banned words included in the user's original message.

In response to the administrator selecting "Add From Predefined Text List" option 610, the control application 158 can provide a display or set of displays suitable for allowing the administrator to select banned text from a predefined text list (such as 504 shown in FIG. 5). In response to the administrator selecting an entry or entries from predefined text list 604 and, then, activating "Add" option 606, the control application 158 can add that entry to banned text list 604. In some embodiments, the control application 158 may update the predefined text list by transmitting and receiving data from a host or other client system, for example Apple® iTunes. In some embodiments, the control application 158 may automatically rate banned words or may provide a way for an administrator to rate banned words. The ratings 622 may, for example, be G, PG, R or X, or any other appropriate ratings. In response to the administrator selecting a rating for a user, the control application 158 may apply that selected rating to filter incoming and outgoing messages for that user.

Returning to FIG. 3, condition menu display 302 also includes authorized text option 308. In response to the administrator's selection of this option, the control application 158 provides a display or set of displays suitable for allowing the administrator to define a list of authorized words. This option functions similar to the required text option 304. Namely, authorized text option 308 allows the administrator to set up a list of authorized words that may be included in a message. In some embodiments, the control application 158 will exclude all unauthorized words from a message. In some embodiments, the control application 158 will provide for the administrator to rate authorized text and only include text with a particular rating. For example, in response to an administrator assigning the user a third grade rating, the control application 158 will include text with a third grade rating in messages.

In some embodiments, the control application 158 will include text that is rated the same as or lower than the user's rating. For example, the control application 158 may include authorized text rated first, second and third grade in a message from the user assigned a third grade rating. In some embodiments, the authorized text may include spelling rules, grammar rules and/or punctuation rules. For example, the control conditions may require the user with a third grade rating to properly spell words assigned a third grade rating, but the user may misspell words assigned a fourth grade or higher rating.

Figure 7:
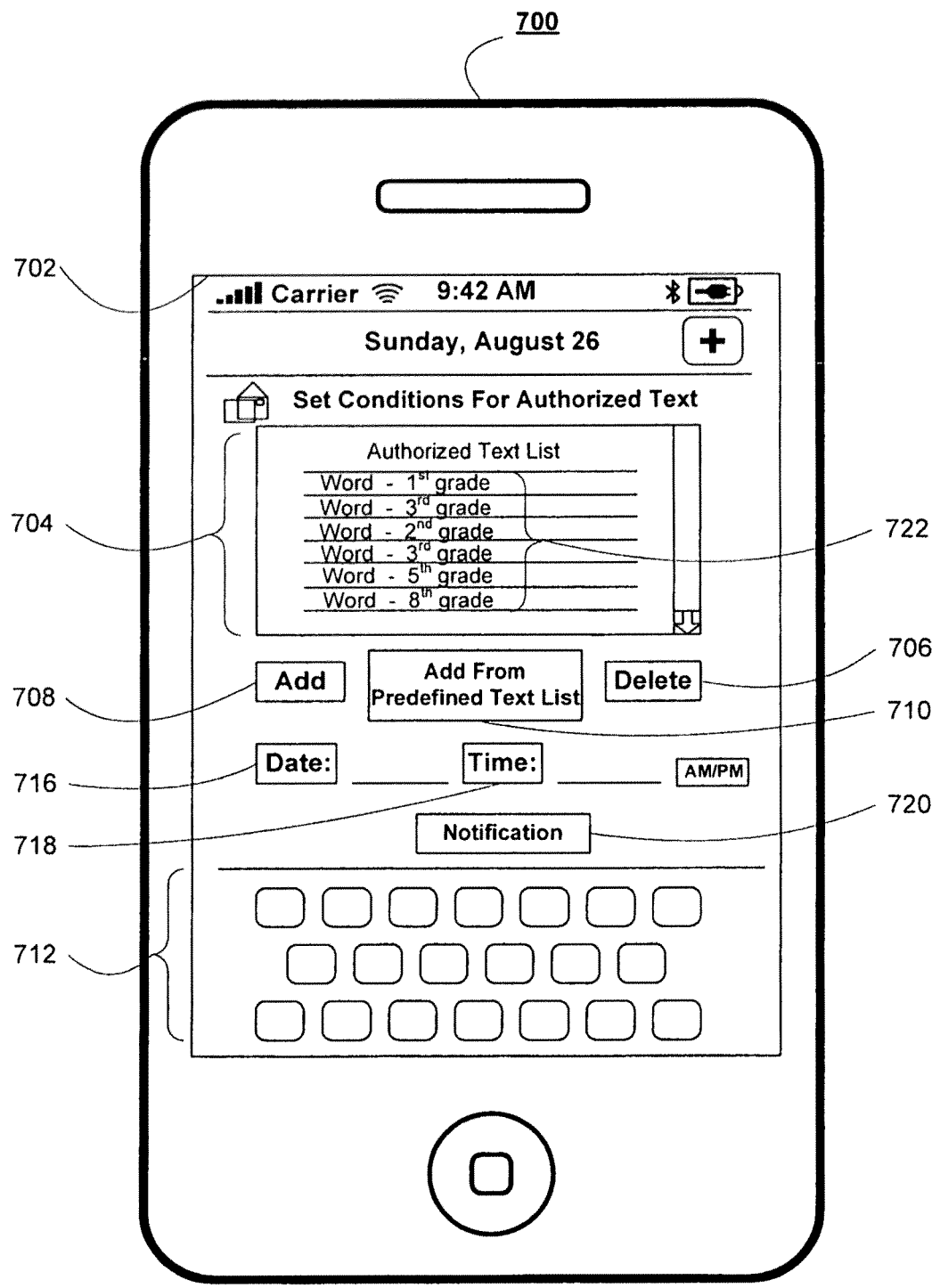

FIG. 7 shows an illustrative authorized words display 702, according to an embodiment of the invention. In this example, display 702 includes list of authorized words 704, "Delete" option 706, "Add" option 708, "Add From Predefined Text List" option 710, "Date" option 716, "Time" option 718, "Notification" option 720 and grading option 722. In response to the administrator selecting a word and selecting "Delete" option 706, the control application 158 can delete the selected word from authorized list 704. In response to the administrator selecting "Add" option 708, the control application 158 can provide an onscreen keyboard 712 that the user can use to enter new authorized text. The control application 158 may also provide a voice recognition program that enables the administrator to add new authorized text to the system by simply speaking the new words.

In response to the administrator selecting "Date" option 716 and/or "Time" option 718, the control application 158 enables the administrator to define the dates, days or times when the authorized text condition is in effect and may be reoccurring. In response to the administrator activating "Notification" option 720, the control application 158 can alert the administrator by e-mail message or other appropriate means of any user's failure to meet the authorized text condition 704. In response to the administrator activating grade option 722, the control application 158 can provide for the administrator to assign a grade to each word.

In response to the administrator identifying "Add From Predefined Text List" 710, the control application 158 can provide a display or set of displays suitable for allowing the administrator to select authorized text 704 from a predefined text list. In response to the administrator selecting an entry or entries from predefined text list 704 and, then, activating "Add" option 706, the control application 158 can add that entry to current authorized text list 704. In some embodiments, the control application 158 may update the predefined text list by transmitting and receiving data from a host or other client system, for example Apple® iTunes or an online dictionary. In some embodiments, the control application 158 may automatically grade authorized words. The grading system 722 may be first (1st), second (2nd), third (3rd), etc., or any other appropriate system. In response to the administrator activating a grade or grades for a user, the control application 158 can apply those selected grades to filter incoming and outgoing messages for that user.

Returning to FIG. 3, condition menu display 302 also includes language option 310. In response to the administrator's selection of this option, the control application 158 provides a display or set of displays suitable for allowing the administrator to define the language of a message.

Figure 8:
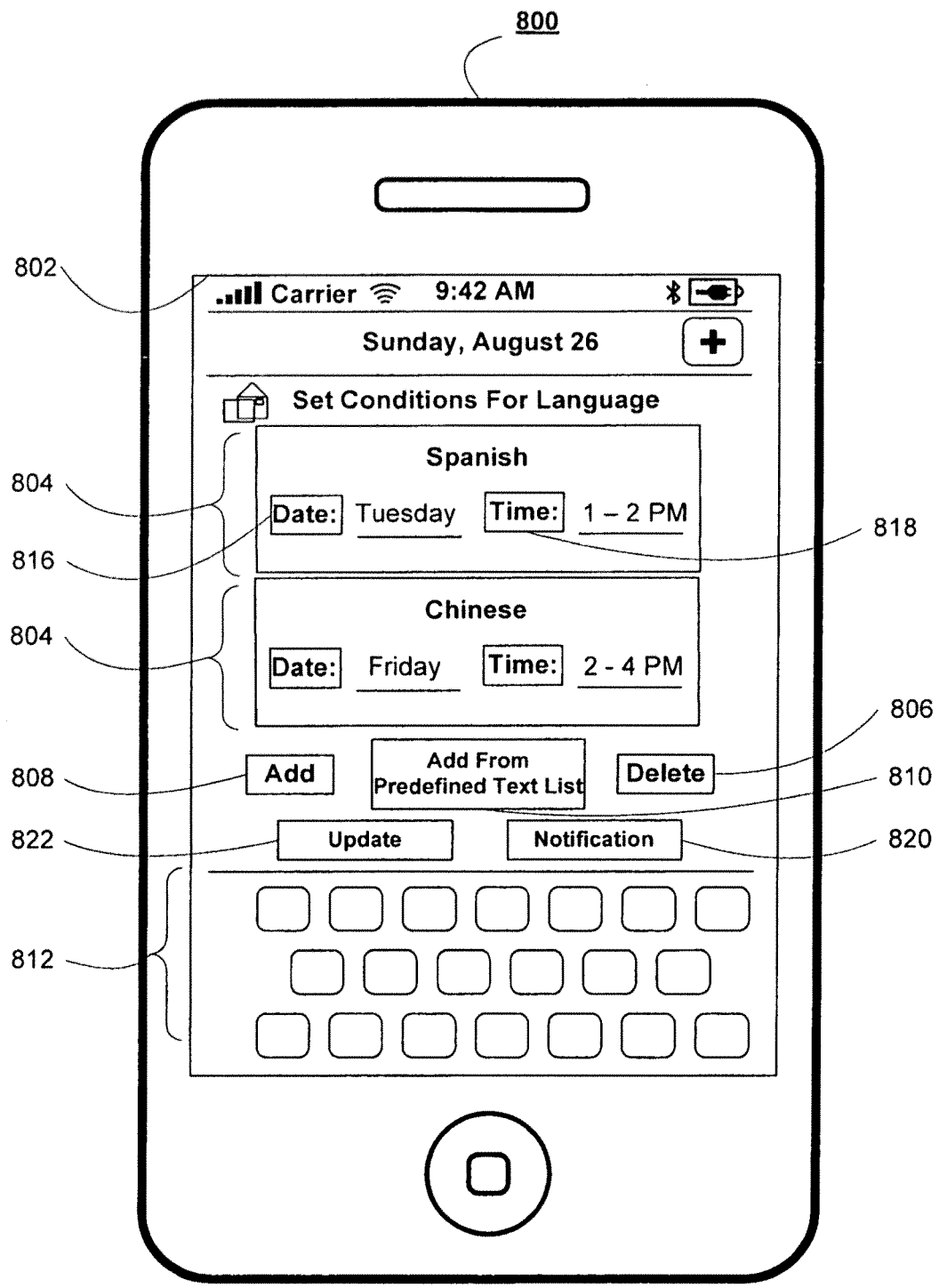

FIG. 8 shows an illustrative language display 802, according to an embodiment of the invention. In this example, display 802 includes list of current language conditions 804, "Delete" option 806, "Add" option 808, "Add From Predefined Text List' option 810, "Date" option 816, "Time" option 818, "Notification" option 820 and "Update" option 822. In response to the administrator selecting a language condition and selecting "Delete" option 806, the control application 158 can delete the selected language condition 804. In response to the administrator selecting "Add" option 808, the control application 158 can provide an onscreen keyboard 812 that a user can use to select a language.

The control application 158 may also provide a voice recognition program that enables the administrator to select a language simply by speaking the name of the language to be added. In response to the administrator selecting "Add From Predefined Text List" option 810, the control application 158 can present a list of languages for setting up language condition 804. In response to the administrator selecting "Date" option 816 and/or "Time" option 818, the control application 158 can provide for the administrator to define the dates, days or times when the language condition is in effect and may be reoccurring.

In response to the administrator selecting "Update" option 822, the control application 158 can provide for the administrator to update language data. In some embodiments, the control application 158 may update the language by transmitting and receiving data from a host or other client system, for example Apple® iTunes or an online foreign language dictionary. In some embodiments, the control application 158 may provide for the administrator to update the language from CDs, DVDs, etc. In response to the administrator activating "Notification" option 820, the control application 158 can alert the administrator and other individuals designated by the administrator, for example, the user's Spanish teacher, by e-mail message or other appropriate means of any user's failure to meet the language condition 804. In some embodiments, control conditions, for example, required text, banned text or authorized text, may include text in a foreign language for controlling messages written in that foreign language.

Returning to FIG. 3, condition menu display 302 also includes other criteria option 312. In response to the administrator's selection of this option, the control application 158 provides a display or set of displays suitable for allowing the administrator to set conditions of a message based on other criteria, such as spelling, grammar and punctuation. For example, the control application 158 may provide for the administrator to require a user to include proper spelling, grammar and/or punctuation in a message.

In some embodiments, the control application 158 may provide for the administrator to define a user's skill level and require that the user include proper spelling, grammar and/or punctuation according to the user's defined skill level. For example, if the user misspells a word within his skill level, the control application 158 may alert the user that an error exists and require the user to locate and correct the error. If the user cannot locate the error, the control application 158 may provide progressive hints (e.g., hints that get easier for the user if the user can not make the correct selection) as to the location of the error by first indicating the paragraph, then, the line and, finally, the exact location.

In some embodiments, the control application 158 may be set to automatically correct spelling, grammar and/or punctuation errors that are above the user's defined skill level. For example, if the user misspells a word above his skill level, the control application 158 may show the user the error and may correct the error for the user. In some embodiments, the control application 158 may provide for the administrator to be notified of a user's errors. For example, the administrator may set the control application 158 to notify the administrator and/or user's teacher of errors within a user's skill level. In some embodiments, the control application 158 may provide for the administrator to be notified of a user's use, and/or attempted use, of words above his skill level.

FIGS. 9-13 show various illustrative display screens of a text-based communication control application in user mode, in accordance with an embodiment of the present invention. The control application 158 enters the user mode in response to the user sending and/or receiving a text-based communication.

Figure 9:
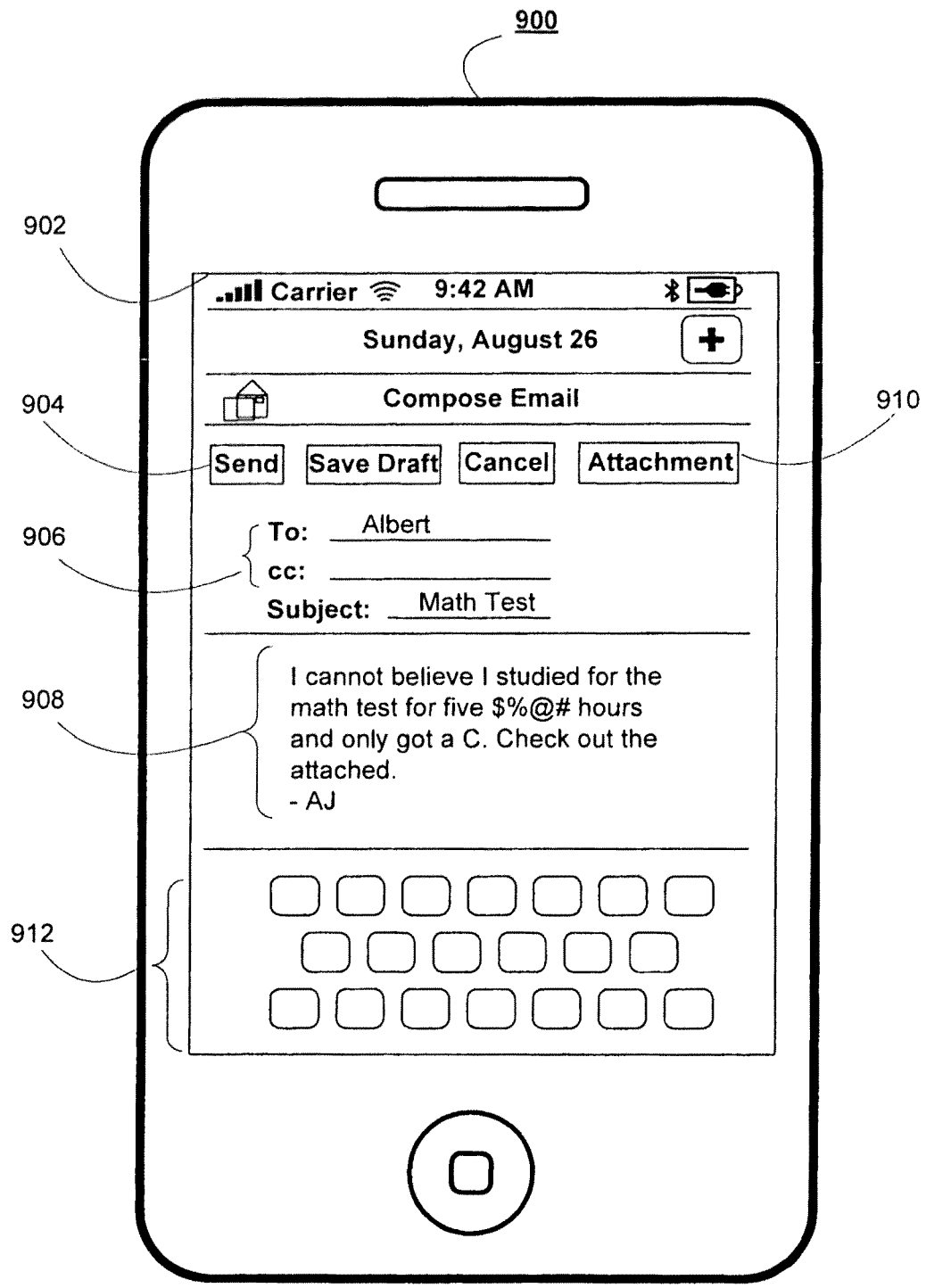
FIGS. 9-13 are illustrative displays of a user mode of a text-based communication control application according to various embodiments of the invention.

FIG. 9 shows an illustrative text message display 902. In this example, display 902 includes "Send" option 904, recipient field 906, message field 908 and "Attachment" option 910. These display features are only illustrative, as other message formats may include a subset of these features, or other features. A user can send an e-mail message by using onscreen keyboard 912 to type a message in message field 908, entering a recipient's e-mail address in recipient field 906 and activating "Send" option 904. In response to the user selecting "Send" option 904, the control application 158 may be activated to filter the message and attachments based on administrator-defined criteria.

Figure 10:
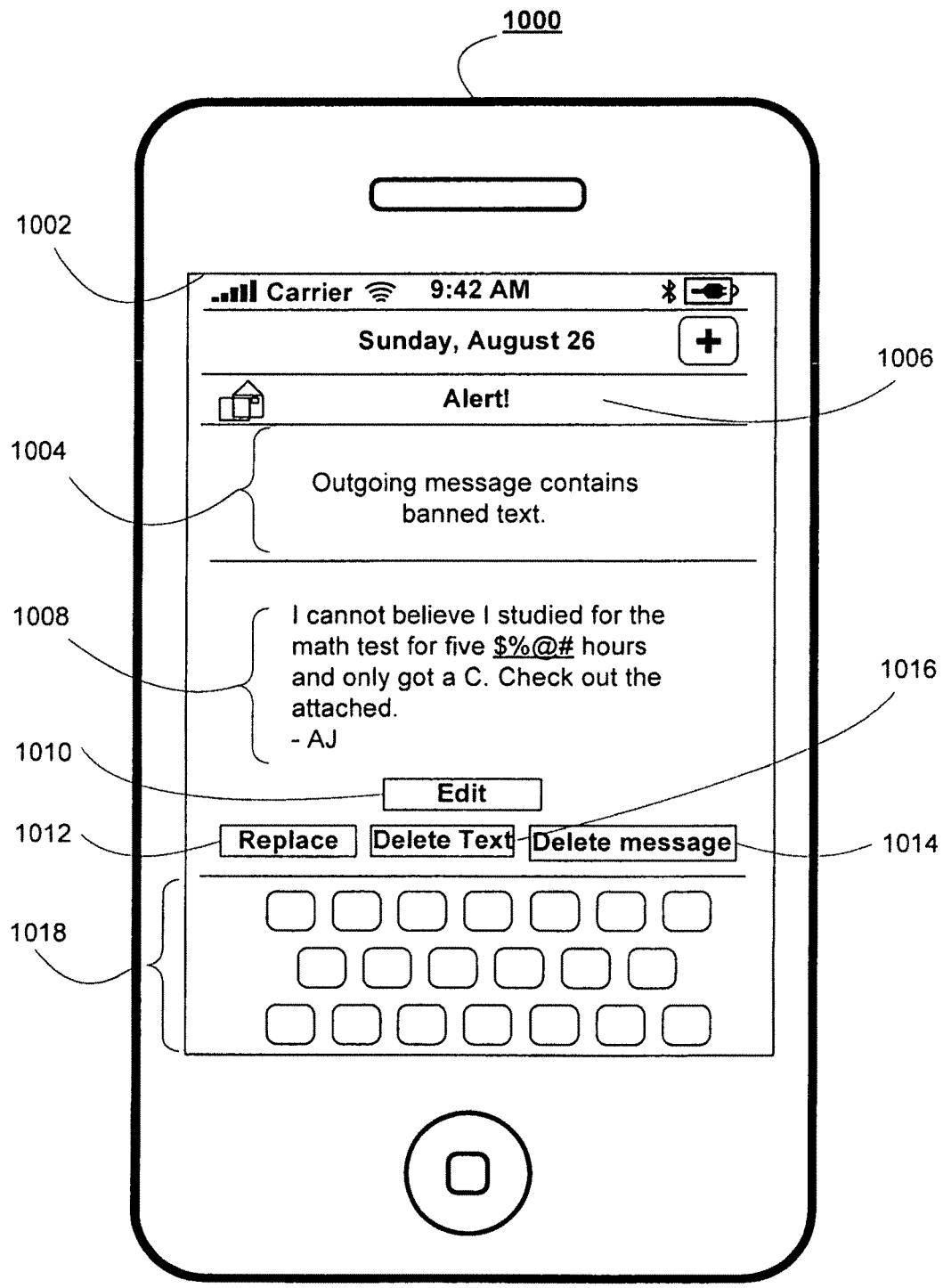

FIG. 10 shows an illustrative warning display 1002, according to an embodiment of the invention. In this example, the user included banned text in a sent e-mail message. Display 1002 includes notification of failed condition 1006, description of failed condition 1004, "Edit" option 1010, "Replace" option 1012, "Delete Text" option 1016 and "Delete Message" option 1014. In this example, display 1002 also includes identification of failed condition in message 1008, where the banned text is underlined. In some embodiments, the control application 158 may specifically identify the failed condition (e.g., text error). In some embodiments, the control application 158 may require the user to locate and correct the error. If the user cannot locate the error, the control application 158 may provide hints as to the location of the error by first indicating the paragraph, then, the line and, finally, the exact location. In some embodiments, if the user cannot correct the error, the control application 158 may provide hints and, ultimately, a correction.

In response to the user selecting "Edit" option 1010, the control application 158 may provide for the user to manually edit and correct the message using the onscreen keyboard 1018. In response to the user selecting "Replace" option

1012, the control application 158 may replace the banned text with similar authorized text. In response to the user selecting "Delete Text" option 1016, the control application 158 may delete the banned text from the message. In response to the user selecting "Delete Message" option 1018, the control application 158 may delete the entire message. In some embodiments, in response to the user selecting "Replace" option 1012 and/or delete text option 1016, the control application 158 may indicate in the message that text was replaced or deleted. In some embodiments, the control application 158 may indicate to the user that the administrator was notified of the failed condition.

Figure 11:
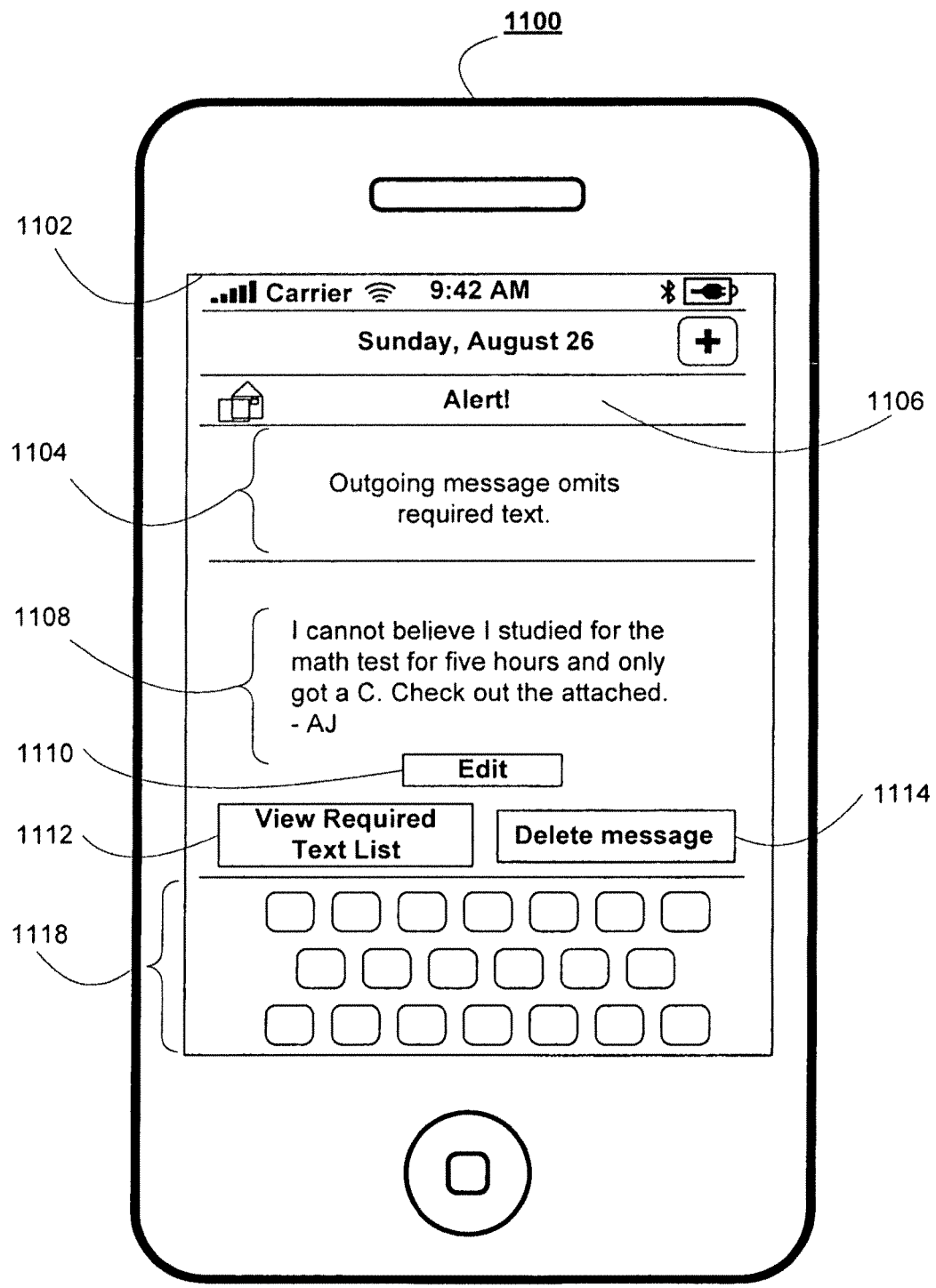

FIG. 11 shows an illustrative warning display 1102, according to an embodiment of the invention. In this example, the user failed to include required text in a sent e-mail message. Display 1102 includes notification of failed condition 1106, description of failed condition 1104, "Edit" option 1110, "View Required Text List" option 1112 and "Delete Message" option 1114.

Figure 12:
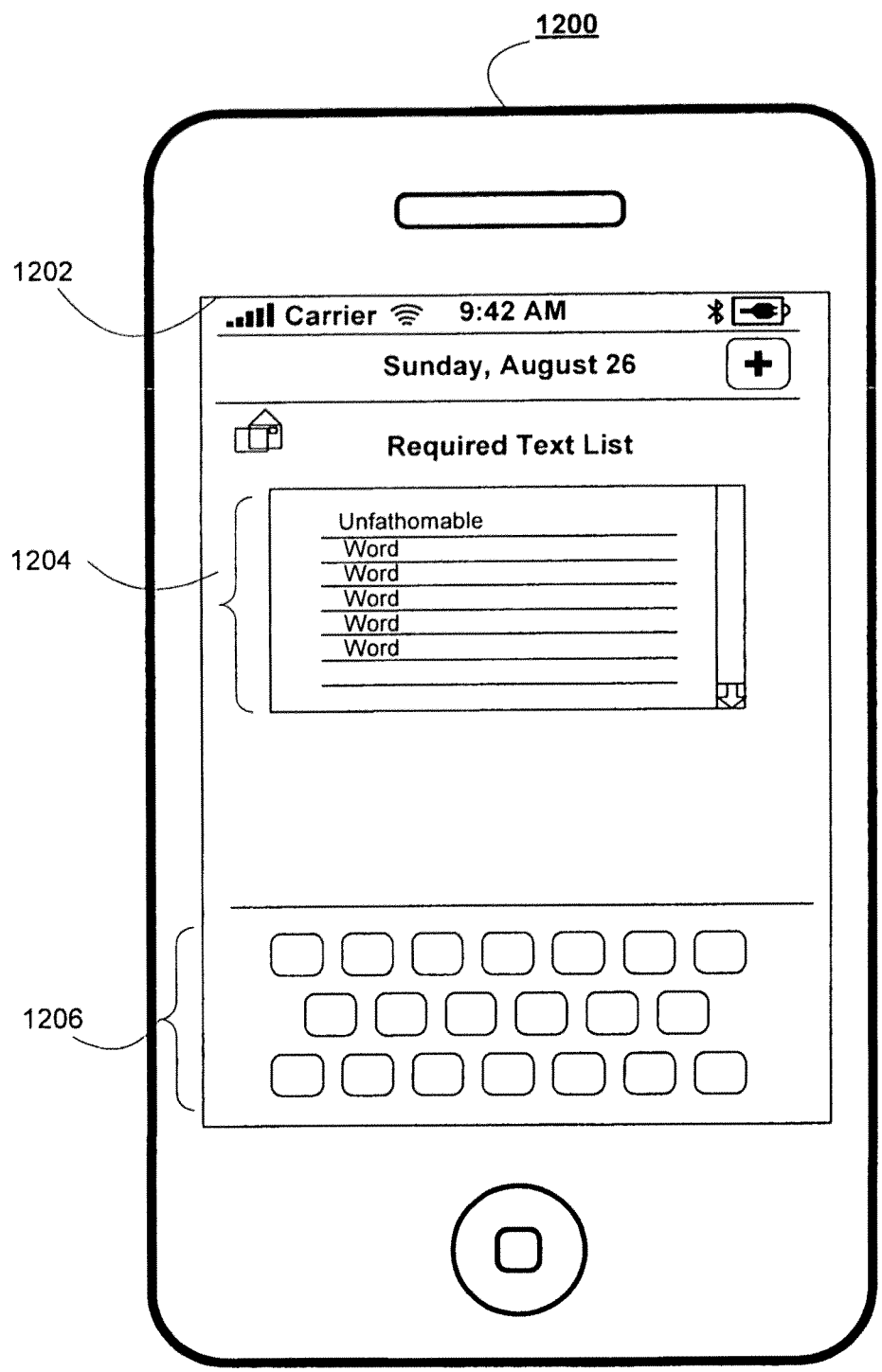

In response to the user selecting "Edit" option 1110, the control application 158 may provide for the user to manually edit and correct the message using the onscreen keyboard 1118. In response to the user selecting "View Required Text List" option 1112, the control application 158 may provide for the user to view required text list 1212 (FIG. 12). In response to the user selecting "Delete Message" option 1118, the control application 158 may delete the entire message. In some embodiments, the control application 158 may indicate to the user that the administrator was notified of the failed condition. In some embodiments, the control application 158 may indicate to the user that the administrator was notified of the user's use of required text.

FIG. 12 shows an illustrative required text list display 1202, according to an embodiment of the invention. In this example, display 1202 includes required text list 1212 and onscreen keyboard 1206. In some embodiments, the control application 158 may provide a dictionary or thesaurus link for the user to look up the meaning of a required word.

Figure 13:
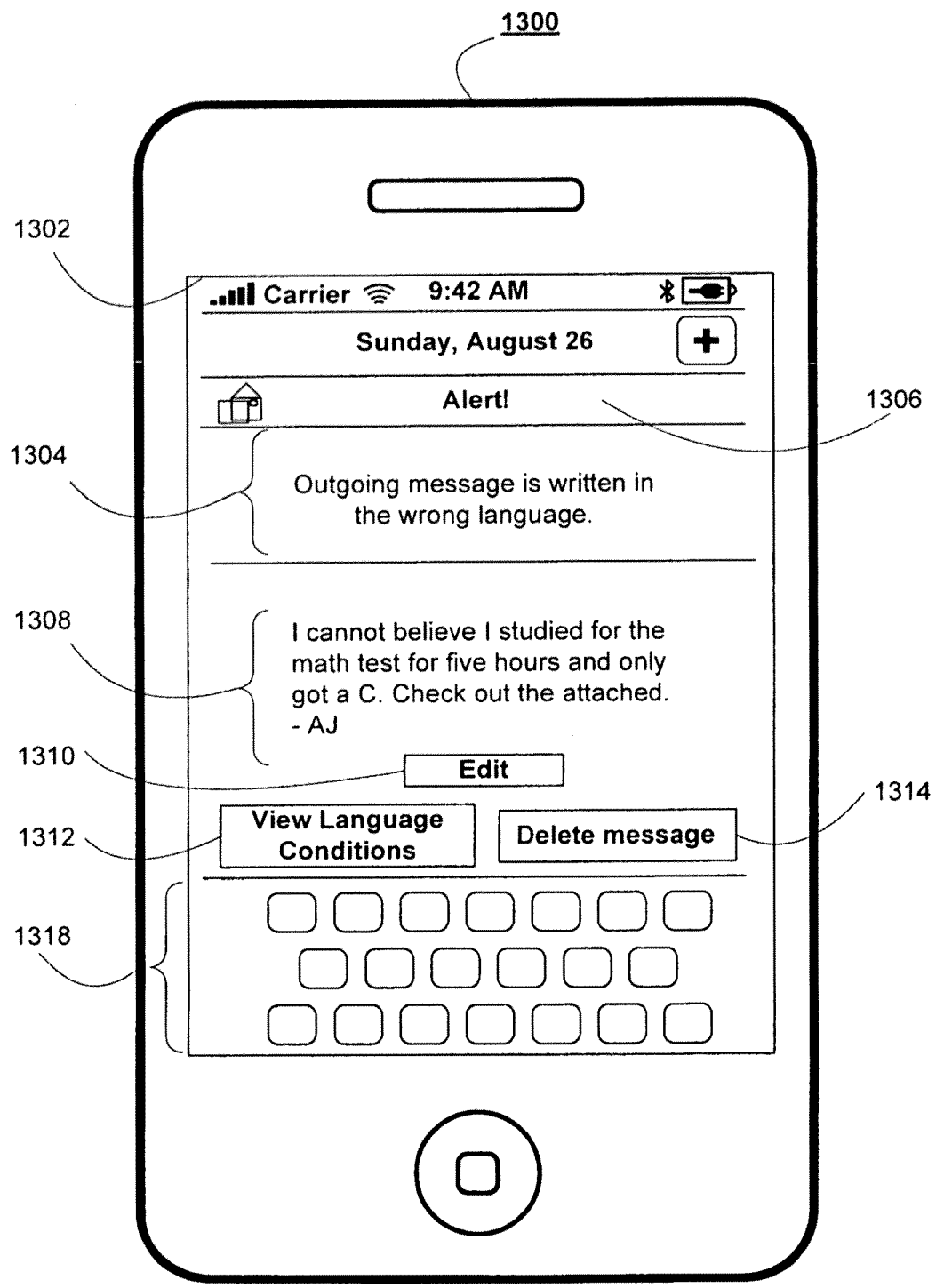

FIG. 13 shows an illustrative warning display 1302, according to an embodiment of the invention. In this example, the user failed to write a sent e-mail message in the required language. Display 1302 includes notification of failed condition 1306, description of failed condition 1304, "Edit" option 1310, "View Language Conditions" option 1312 and "Delete Message" option 1314.

In response to the user selecting "Edit" option 1310, the control application 158 can enable the user to manually edit and correct the message using the onscreen keyboard 1318. In response to the user selecting "View Language Conditions" option 1312, the control application 158 may provide for the user to view the required language. In response to the user selecting "Delete Message" option 1318, the control application 158 may delete the entire message. In some embodiments, the control application 158 may indicate to the user that the administrator was notified of the failed condition. In some embodiments, the control application 158 may indicate to the user that the administrator was notified of the user's use of a required language.

Figure 14:
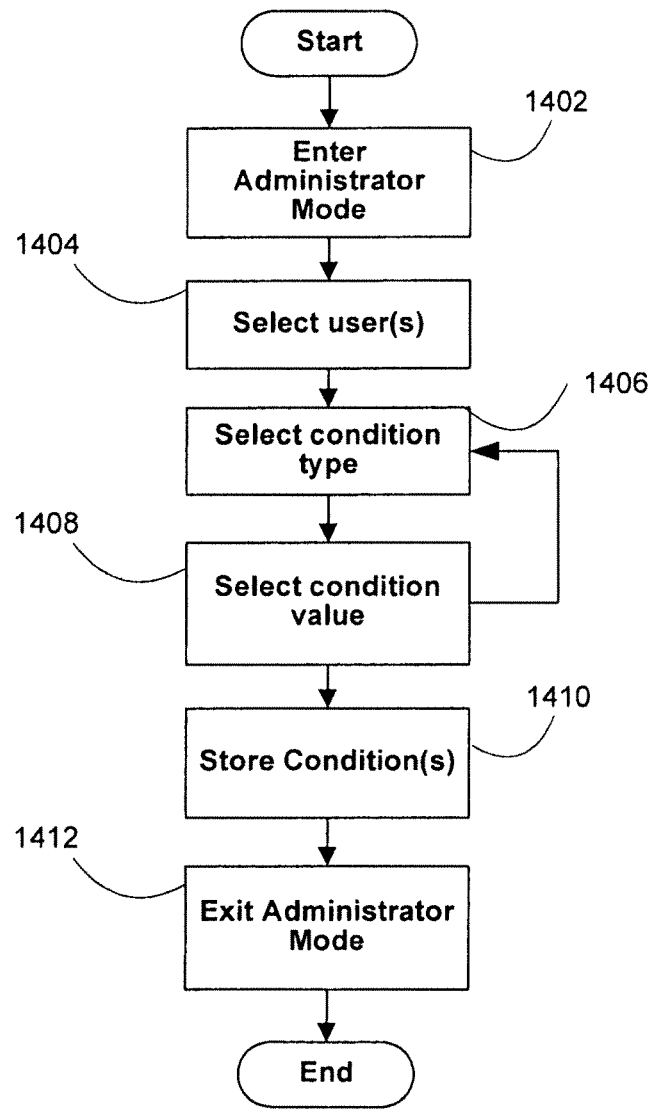
FIG. 14 is a flowchart of an illustrative process for generating control conditions in an administrative mode of the control application according to one embodiment of the invention.

FIG. 14 is a flowchart of an illustrative process for generating control conditions in an administrative mode of the control application in accordance with one embodiment of the invention. At step 1402, the control application 158 enters administrative mode. This may be performed in response to, for example, receiving a password or other suitable access code entered by an administrator using the onscreen keyboard. At step 1404, the control application (such as the various forms of control application 158 described above) selects one or more users with which the control conditions will be associated. This may be performed in response to, for example, receiving user names, e-mail addresses or other indicia suitable for identifying a user or group of users. The control application may provide an onscreen keyboard, a voice recognition application or other suitable means for the administrator to input information.

At step 1406, the control application selects conditions according to administrator inputs. For example, the administrator may select the condition type from a display screen of the control application such as display screen 302 (FIG. 3), which can include options 304, 306, 308, 310 or 312, for example. In this example, the user appropriate conditions may be set according to required text, banned text, authorized text, language and other criteria such as spelling, grammar and punctuation. This list is just illustrative as other suitable conditions (and associated values) may be used as appropriate to the given application.

At step 1408, the control application selects condition values according to administrator inputs. For example, the administrator may select condition values for authorized text according to the user's educational or skill level, such as that shown by reference numeral 722 on FIG. 7. FIGS. 4-8 show various illustrative displays of conditions and values that may be defined in response to administrator selections. At step 1410, the control application stores the conditions and at step 1412 exits the administrator mode in response to the administrator logging out or after a period of inactivity.

Figure 15:
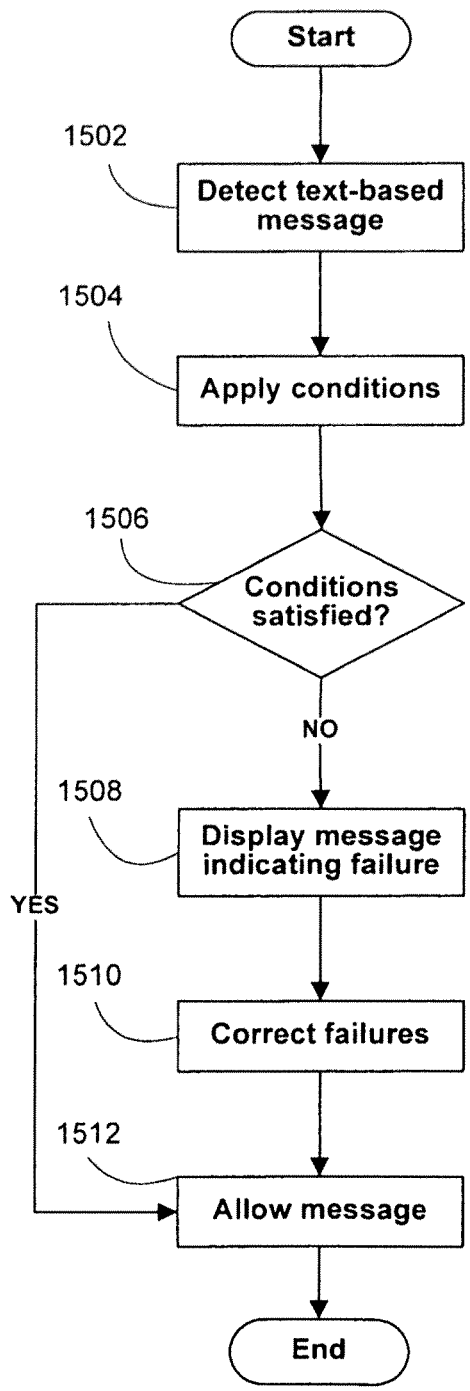
FIG. 15 is a flowchart of an illustrative process for applying control conditions according to one embodiment of the invention.

FIG. 15 is a flowchart of an illustrative process for applying control conditions in accordance with one embodiment of the invention. At step 1502, the control application (such as the various forms of control application 158 described above) may detect a message in response to attempts by the text-based communication application running on user device, such as device 200 shown in FIG. 2, to communicate, such as by sending or receiving a message. The control application may be part of the text-based communication application or may be a separate application. Further, the control application may be stored on a user device or it may be stored on a separate administrator device (such as devices 152 and 156 shown in FIG. 1C) that is in communication with the user device. The message may be any text-based communication such as e-mail, instant messaging or text messaging. At step 1504, the control application may apply the control conditions to this message. At step 1506, the control application may determine whether the message satisfies applicable control conditions, such as those described in accordance with FIG. 14 above. If the message does not satisfy the conditions, the control application may block the message from being sent or received. If the control conditions are not met, the control application may display a message indicating the conditions are not met and may prompt the user to correct the message (step 1508). Illustrative messages are shown in FIGS. 10, 11 and 13.

At step 1510, the control application or the user may correct the message to comply with the control conditions. In some instances, the control application may automatically correct the failure, for example, when a message is received that contains banned words and there is no opportunity to require the sender to correct the message. The control application may provide the user with the option of having the error be corrected automatically. For example, the user may select the correction means from a display screen of the control application such as display screen 1002 of FIG. 10, which can include options 1010, 1012, 1014 and/or 1016. In this example, the user may choose to make the correction manually or may choose to have the control application automatically replace or delete the banned word, or delete the entire message. Illustrative correction options are shown in FIGS. 10, 11 and 13. At step 1512, once all control conditions are satisfied, the control application may allow the message to be sent or received.

Figure 16A:
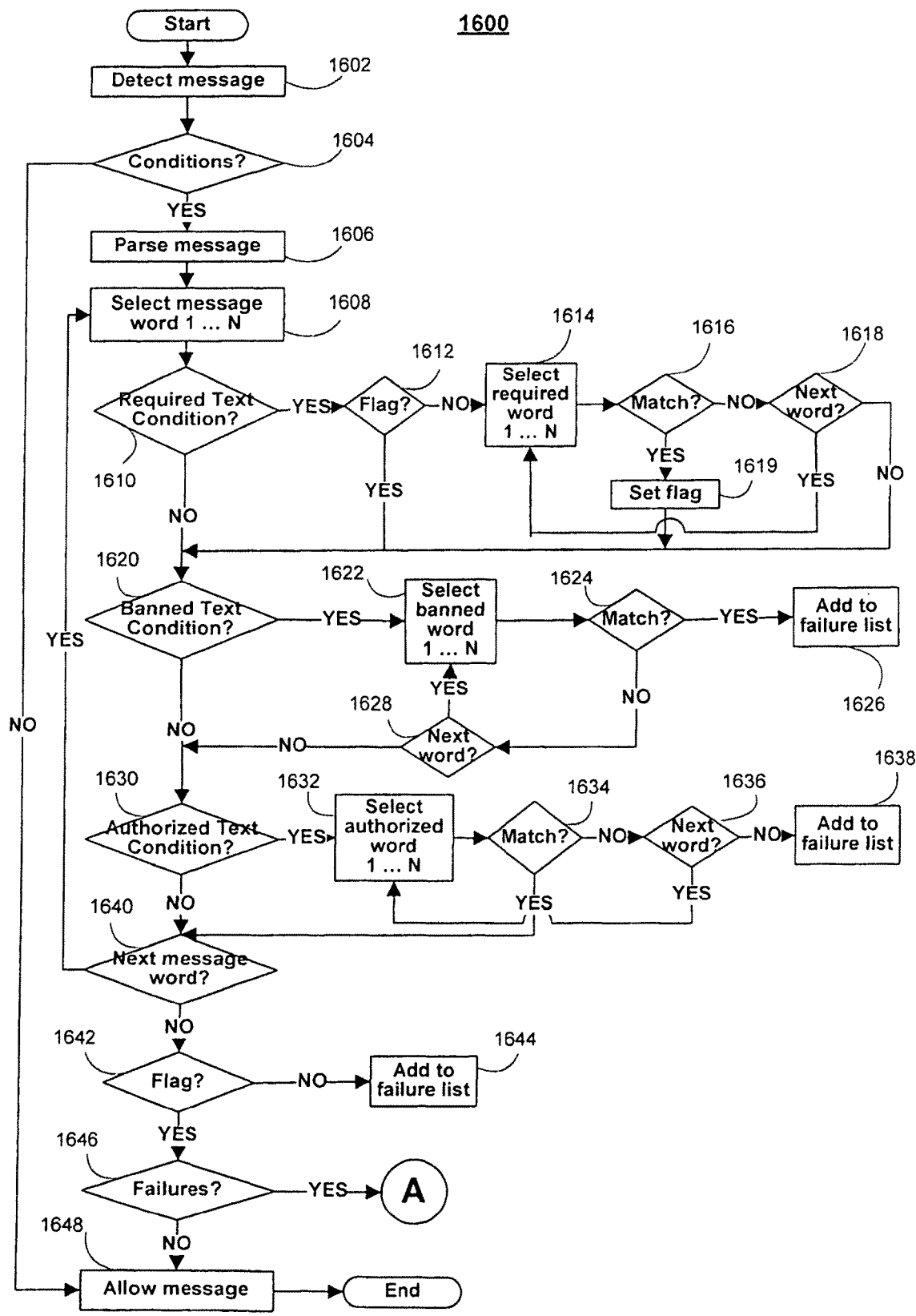
FIG. 16A is a flowchart of an illustrative process for applying control conditions according to one embodiment of the invention.

FIG. 16A is a flowchart of an illustrative process for applying control conditions in accordance with one embodiment of the invention. At step 1602, the control application may detect a message that is being sent or received by the user. At step 1604, the control application may determine whether control conditions, set by the administrator, apply to the message. If control conditions do not apply to the message, the control application may proceed to step 1648 and may allow the message to be sent or received. If it is determined control conditions apply, the control application 158 may proceed to step 1606. At step 1606, the message is parsed into each word in the message. Each word of the message is compared to the control conditions and evaluated as to whether or not the word satisfies the conditions. At step 1608, the control application may select the first word of the message for evaluation.

At step 1610, the control application may determine whether or not a required text condition applies. In some embodiments, the user may be required to include all words from the required text list in the message. In this example, the user is required to include at least one of the words from the required text list in the message. If there is no required text condition, the control application may proceed to step 1620.

At step 1612, the control application may determine whether a flag indicates that a required word is included in the message. If a flag is set, thus indicating that a required word is included, the control may skip checking the remaining message words for this condition. If a flag is not set, the control application may continue checking the remaining message words for a required word.

At step 1614, the control application may select the first word or phrase from the required text list. At step 1616, the control application may determine whether the required word is the same as the message word. If the words match, the required condition is satisfied and a flag is set at step 1619. If the words do not match, the control application may proceed to step 1618 to determine whether or not there is another word in the required text list. If there is another word in the required text list, the control application may continue searching for a match by selecting the next word (step 1614), by comparing the words to see if they match (step 1616) and, if there is a next required word (step 1618), by repeating steps 1614 and 1616. Once all of the required words have been compared to the message word, the control application may proceed to step 1620.

At step 1620, the control application may determine whether or not a banned text condition applies. In some embodiments, the banned words may be rated according to a rating system. In such embodiments, the banned text list may be defined by the user's rating. The user's rating may be determined, for example, by age, by geographical location or by other factors. For example, the user may be assigned an R-rating in a system that includes G, PG, R and X ratings. The control application may include only x-rated text in the user's banned text list. Word ratings may be automatically assigned according to an established rating system and may be downloaded from an Internet source such as Apple® iTunes. In some embodiments, the administrator may manually assign ratings to words.

At step 1622, the control application may select the first word or phrase from the banned text list. At step 1624, the control application may determine whether the banned word is the same as the message word. If the words match, the required condition is not satisfied and the non-compliance is added to the failure list at step 1626. Whether or not the words match, the control application may proceed to step 1628 to determine whether or not there is another word in the banned text list. If there is another word in the banned text list, the control application may continue searching for a match by selecting the next word (step 1622) and by comparing the words to see if they match (step 1624). The control application may repeat steps 1622, 1624 and 1628 until all words on the banned list have been compared to the message word. Any words that match may be added to the failure list (steps 1626). Once all of the banned words have been compared to the message word, the control application may proceed to step 1630.

At step 1630, the control application may determine whether or not an authorized text condition applies. In some embodiments, the authorized text may be language rules such as spelling, grammar and punctuation. In these embodiments, the control application would compare the message words or sentences to the rule to see if the condition is met. In some embodiments, the authorized text may be rated or ranked according to a rating system. In such embodiments, the authorized text list may be defined by the user's rating. The user's rating may be determined, for example, by age, by educational skill level or by other factors. For example, the user may be assigned a third grade rating in a system that includes first grade through twelfth ratings. In this example, the control application 158 may apply only third grade conditions to the user. Alternatively, the control application may apply first through third grade conditions to the user. Authorized text ratings may be automatically assigned according to an established rating system and may be downloaded from an Internet source such as Apple® iTunes. In some embodiments, the administrator may assign these ratings manually.

At step 1632, the control application may select the first word from the authorized text list. At step 1634, the control application may determine whether the authorized word is the same as the message word. If the words do not match, the control application may proceed to step 1636 to determine whether or not there is another word in the authorized text list that matches. If there is another word in the authorized text list, the control application may continue searching for a match by selecting the next word (step 1632) and by comparing the words to see if they match (step 1634). The control application may repeat steps 1632, 1634 and 1636 until all words on the authorized list have been compared to the message word. If, after the message word has been compare to every authorized word, no words match, the required condition is not satisfied and the non-compliance is added to the failure list at step 1638. Once all of the authorized words have been compared to the message word, the control application may proceed to step 1640.

At step 1640, the control application may determine if there are more words in the message to which to apply control conditions. If there are more words in the message, the control application proceeds to step 1608. At step 1608, the control application may select the next message word and follow steps 1610 through 1638 as described above. The control application may continue this process until all message words have been evaluated according to the control conditions. Once all the message words have been evaluated, the control application may proceed to step 1642.

At step 1642, the control application may determine whether there is a flag to indicate that the required text condition is met. If there is no flag, the required text condition fails and this failure is added to the failure list at step 1644. If there is a flag, the required text condition is satisfied and the control application proceeds to step 1646.

At step 1646, the control application determines whether all control conditions have been satisfied. If the user complied with all conditions, the control application allows the message to be sent or received (step 1648). If the user fails to meet all conditions, the control application may proceed to step 1650 (FIG. 16B) to evaluate each failure.

Figure 16B:
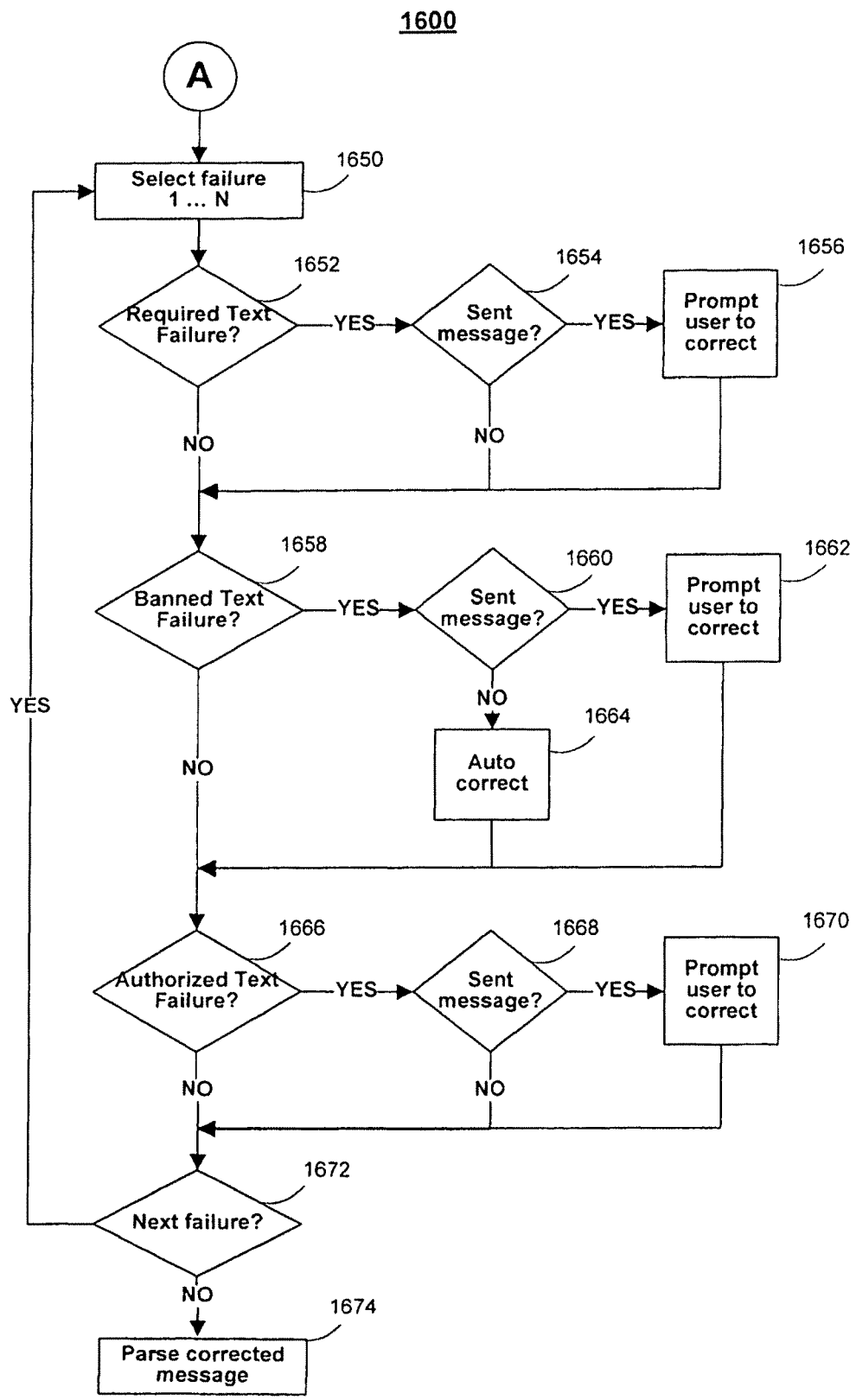
FIG. 16B is a flowchart of an illustrative process for correcting a message that fails to comply with control conditions according to one embodiment of the invention.

FIG. 16B is a flowchart of an illustrative process for correcting a message that fails to comply with control conditions in accordance with one embodiment of the invention. At step 1650, the control application may detect a text failure. In some embodiments, the control application may send the user warning after each failure is identified. In some embodiments, the control application may assemble a list of failures and may notify the user after all failures have been identified. In some embodiments, once the failure has been identified, the control application may proceed with analyzing the next failure, if any. In some embodiments, the control application may continue analyzing the failure according to each condition associated with the user.

At step 1652, the control application may determine whether the failure is a required text failure. The message fails a required text control condition if it excludes required text. If it is determined that the failure is not required text, the control application may proceed to analyze for the next failure at step 1658. At step 1654, the control application may determine whether the message is being sent by the user or being received by the user. If the user is receiving the message, the required text condition may not apply to that sender and the control application may proceed to step 1658. At step 1656, if the user is sending the message, the control application may prompt the user to correct the control condition failure. FIG. 11 shows one example of an illustrative warning display 1102 of a failed required text condition. In this example, the warning display 1102 prompts the user to correct the message by manually editing the message 1110 or by deleting the message 1114.

At step 1658, the control application may determine whether the failure is a banned text failure. The message fails a banned text control condition if it includes banned text. If it is determined that the failure is not banned text, the control application may proceed to analyze for the next failure at step 1666.

At step 1660, the control application may determine whether the message is being sent by the user or being received by the user. At step 1664, if the user is receiving the message, the control application may automatically correct the banned text condition by replacing the text, by deleting the text or by blocking the message from being delivered (e.g., deleting the message). At step 1662, if the user is sending the message, the control application may prompt the user to correct the control condition failure. FIG. 10 shows one example of an illustrative warning display 1002 of a failed banned text condition. In this example, the warning display 1002 prompts the user to correct the message by manually editing the message 1010 or by choosing options 1012, 1014 or 1016 to have the control application automatically correct the message.

At step 1666, the control application may determine whether the failure is an authorized text failure. The message fails an authorized text control condition when it includes unauthorized text. If it is determined that the failure is not due to unauthorized text, the control application may proceed to step 1672 to determine whether there is another failure to analyze.

At step 1668, if the message fails an authorized text control condition, the control application may determine whether the message is being sent by the user or being received by the user. If the user is receiving the message, the authorized text condition may not apply to that sender and the control application may proceed to step 1672. In some embodiments, if the user is receiving the message, the control application may automatically correct the unauthorized text condition by replacing the text, by deleting the text or by blocking the message from being delivered (e.g., deleting the message). At step 1670, if the user is sending the message, the control application may prompt the user to correct the control condition failure. For example, the warning display may prompt the user to correct the message by manually editing the message or by choosing to have the control application automatically correct the message.

At step 1672, the control application may determine if additional failures need to be identified. At step 1608, the control application may select the next failure and follow steps 1662 through 1670 as described above. The control application may continue this process for analyzing the failure until all failures have been identified. Once all failures have been identified and corrected, the control application may proceed to step 1674. At step 1674, the control application may parse the corrected message for control condition failures according to the process described in FIG. 16A.

Various configurations described herein may be combined without departing from the present invention. The above-described embodiments of the present invention are presented for purposes of illustration and not of limitation. The present invention also can take many forms other than those explicitly described herein. Accordingly, it is emphasized that the invention is not limited to the explicitly disclosed methods, systems and apparatuses, but is intended to include variations to and modifications thereof which are within the spirit of the following claims.

What is claimed is:

1. A text-based communication device comprising:
   viewing circuitry that enables a user to view a text message;
   receiver circuitry for receiving the text message from a sender; and
   processor circuitry for controlling whether or not the text message is provided to the viewing circuitry based on at least a portion of the text message and at least one message control condition, wherein the at least one message control condition comprises a condition that the text message be in a designated language.

2. The device of claim 1, wherein the at least one message control condition further comprises at least one of:
   a condition that the text message does not include banned text and, a condition that the text message include authorized text.

3. The device of claim 2 further comprising:
   data-storage circuitry that stores information comprising at least one of: a plurality of banned text words, a plurality of authorized text words, and a plurality of designated language forms.

4. The device of claim 3, wherein the processing circuitry comprises:
   comparison circuitry that compares the at least a portion of the text message with the information in the data storage circuitry to determine whether the text message satisfies the at least one message control condition.

5. The device of claim 4, wherein the processing circuitry comprises at least one of:
   prevention circuitry that prevents the text message from being displayed by the viewing circuitry if the text message does not satisfy one or more of the at least one message control condition; and passing circuitry that allows the text message to be displayed by the viewing circuitry if the text message satisfies all of the at least one message control condition.

6. The device of claim 5, wherein the processing circuitry comprises:
prompting circuitry that prompts the sender to modify the text message if the text message does not satisfy all of the at least one message control condition.

7. A text-based communication device comprising:
viewing circuitry that enables a user to view a text message;
receiver circuitry for receiving the text message from a sender; and
processor circuitry for controlling whether or not the text message is provided to the viewing circuitry based on at least a portion of the text message and at least one message control condition, wherein the at least one message control condition comprises at least one rated message control condition that is based on the user's designated language skill rating.

8. The device of claim 7, wherein the at least one rated message control condition is applied to the at least a portion of the text message that is at or below the user's designated language skill rating.

9. The device of claim 1, wherein the condition that the text message be in the designated language comprises a condition that the text message include at least one of:
a required foreign language, a required foreign vocabulary, a required foreign spelling, a required foreign grammar and a required foreign punctuation.

10. A method for filtering a text message on a text-based communication device comprising:
receiving an input of a text message input or an edit to the text message; and
processing the text message to control the sending of the text message based on at least a portion of the text message and at least one message control condition, wherein the at least one message control condition comprises a condition the the text message include at least one required text word selected from a list of required text words that must appear in the text message.

11. A method for filtering a text message on a text-based communication device comprising:
receiving an input of a text message input or an edit to the text message; and
processing the text message to control the sending of the text message based on at least a portion of the text message and at least one message control condition, wherein the at least one message control condition comprises at least one rated message control condition that is based on a user's designated language skill rating.

12. The method of claim 11, wherein to control the sending of the text message comprises at least one of:
preventing the sending of the text message if the message does not satisfy the at least one rated message control condition; and
allowing the sending of the text message if the message satisfies all of the at least one rated message control condition.

13. A method for filtering a text message received by a text-based communication device comprising:
receiving the text message; and
processing the text message to control whether the text message is displayed to a user based on at least a portion of the text message and at least one message control condition, wherein the at least one message control condition varies for different days or times, and wherein the at least one message control condition comprises a condition that the text message be in a designated language.

14. A method for filtering a text message received by a text-based communication device comprising:
receiving the text message; and
processing the text message to control whether the text message is displayed to a user based on at least a portion of the text message and at least one message control condition, wherein the at least one message control condition comprises at least one rated message control condition that corresponds to a user's designated language skill rating.

15. The method of claim 14, wherein to control whether the text message is displayed comprises at least one of:
preventing the receiving of the text message if the message does not satisfy the at least one rated message control condition; and
allowing the receiving of the text message if the message satisfies all of the at least one rated message control condition.

16. A communications system comprising:
a first communication device for performing at least one of sending and receiving a text message; and
an administrator unit that sets conditions that permit the first communication device to send and receive the text message based on content of the text message, wherein the at least one message control condition varies for different days or times, and
wherein the at least one message control condition comprises a condition that the text message include at least one of: a required foreign language, a required foreign vocabulary, a required foreign spelling, a required foreign grammar and a required foreign punctuation.

\* \* \* \* \*